United States Patent [19]

Mori et al.

[11] Patent Number: 4,839,641
[45] Date of Patent: Jun. 13, 1989

[54] PAGER RECEIVER CAPABLE OF CONTROLLING AN INTERNAL STATE BY A CALL SIGNAL

[75] Inventors: Toshihiro Mori; Takashi Ohyagi, both of Tokyo, Japan

[73] Assignee: NEC Corporation, Tokyo, Japan

[21] Appl. No.: 205,018

[22] Filed: Jun. 9, 1988

Related U.S. Application Data

[63] Continuation of Ser. No. 786,935, Oct. 11, 1985, abandoned.

[30] Foreign Application Priority Data

| Oct. 12, 1984 | [JP] | Japan | 59-212594 |
| Oct. 12, 1984 | [JP] | Japan | 59-212595 |
| Oct. 12, 1984 | [JP] | Japan | 59-212596 |
| Oct. 12, 1984 | [JP] | Japan | 59-212597 |
| Oct. 12, 1984 | [JP] | Japan | 59-212598 |
| Oct. 12, 1984 | [JP] | Japan | 59-212599 |
| Oct. 12, 1984 | [JP] | Japan | 59-212600 |

[51] Int. Cl.$^4$ .................................. H04Q 1/00
[52] U.S. Cl. ..................... 340/825.47; 340/825.48
[58] Field of Search ................ 370/79–84; 340/825.44–825.48; 455/343

[56] References Cited

U.S. PATENT DOCUMENTS

| 4,039,757 | 8/1977 | Frisone | 370/82 X |
| 4,126,764 | 11/1978 | Downey et al. | 370/83 |
| 4,353,065 | 10/1982 | Mori | 455/343 X |
| 4,369,443 | 1/1983 | Giallanza et al. | 340/825.47 |
| 4,383,257 | 5/1983 | Giallanza et al. | 340/825.47 |
| 4,410,889 | 10/1983 | Bryant et al. | 370/82 X |

Primary Examiner—Ulysses Weldon
Attorney, Agent, or Firm—Sughrue, Mion, Zinn, Macpeak, and Seas

[57] ABSTRACT

In a pager receiver operable in response to a call signal comprising a first part including a call number signal, a second part including a message signal, and an intermediate part placed between the first and second parts, the intermediate part conveys a time interval signal representative of a length of a message carried by the message signal. When the call number signal is destined to the pager receiver, a receiving circuit is put into an operating mode during the length of the message. Otherwise, the receiving circuit is kept in a nonoperating mode during the length of the message. The time interval signal is therefore detected even when the call number signal is not destined to the pager receiver. The intermediate part may comprise a message control signal defining message control operations of the pager receiver and a time signal for specifying a transmission time instant of the message signal. A wide variety of the message control operations can be designated by the messagew control signal.

15 Claims, 13 Drawing Sheets

PAGER RECEIVER CAPABLE OF CONTROLLING AN INTERNAL STATE BY A CALL SIGNAL

This is a continuation of application Ser. No. 786,935 filed Oct. 11, 1985, now abandoned.

BACKGROUND OF THE INVENTION:

This invention relates to a pager receiver for use in carrying out unidirectional communication in a paging system.

A recent remarkable development of an integrated circuit technique makes a pager receiver compact or portable and multifunctional. Preferably, the pager receiver has a long life. Inasmuch as a battery is used as a power source in such a portable pager receiver, a life time of the portable pager receiver is dependent upon that of the battery. Therefore, electric power must not be wasted in the pager receiver. In other words, useless operation should strictly be restricted. For this purpose, a battery saving operation is carried out in such a portable pager receiver during nonreception of an address signal, namely, a call number signal destined for the portable pager receiver.

A wide variety of codes have been proposed for a conventional paging system. By way of example, the codes may be exemplified by the POCSAG code which is an abbreviation of The British Post Office Code Standardisation Advisory Group code and which has been published in "A standard code for radiopaging" by The British Post Office (July, 1979). The POCSAG code comprises a preamble and a plurality of batches following the preamble. Each batch lasts a predetermined duration and comprises a synchronization codeword and a plurality of frames equal in number to eight. A number of pager receivers are clustered into eight groups so as to carry out communication through the respective frames. Each frame is divided into two parts for address or message codewords. It should be noted here that a message is variable in length and may be long in comparison with the length of each codeword. Therefore, a plurality of codewords might be necessary for transmission of the message. In this event, not only a preassigned frame but also the following one or ones of the frames should be occupied by the pager receiver in question to transmit such a long message.

During transmission of the long message, the occupied frames can not be used by the other pager receivers. Nevertheless, by design, such other pager receivers well become operative each time that the predetermined period expires. Electric power is therefore wasted during such an invalid operation and is undesiredly consumed by the other pager receivers, even when the conventional battery saving operation is carried out.

In addition, new services and functions may be contemplated by the use of such a pager receiver.

SUMMARY OF THE INVENTION

It is an object of this invention to provide a pager receiver which is capable of effectively saving electric power consumption during nonreception of a desired or destined signal.

It is another object of this invention to provide a pager receiver of the type described which can offer valuable services and function.

A pager receiver to which this invention is applicable is capable of responding to call signals, each comprising a first part, a second part after the first part, and an intermediate part between the first and second parts. The first part comprises a call number signal specific to the pager receiver while the second part comprises a message signal representative of a message. The pager receiver comprises reception means put into an operating mode and a nonoperating mode for receiving the call signals in the operating mode to produce reception call signals representative of the call signals received during the operating mode and processing means responsive to the reception call signals for processing the first, second, and intermediate parts of each of the call signals received during the operating mode to produce a selection signal indicative of either of the operating and nonoperating modes. According to this invention, the intermediate part comprises a time interval signal representative of a length of the message included in the second part following the intermediate part. The processing means comprises producing means responsible to the reception call signals for producing the selection signal with reference to the time interval signal to put the reception means into the operating and nonoperating modes in dependency upon the message length.

Figure 1:
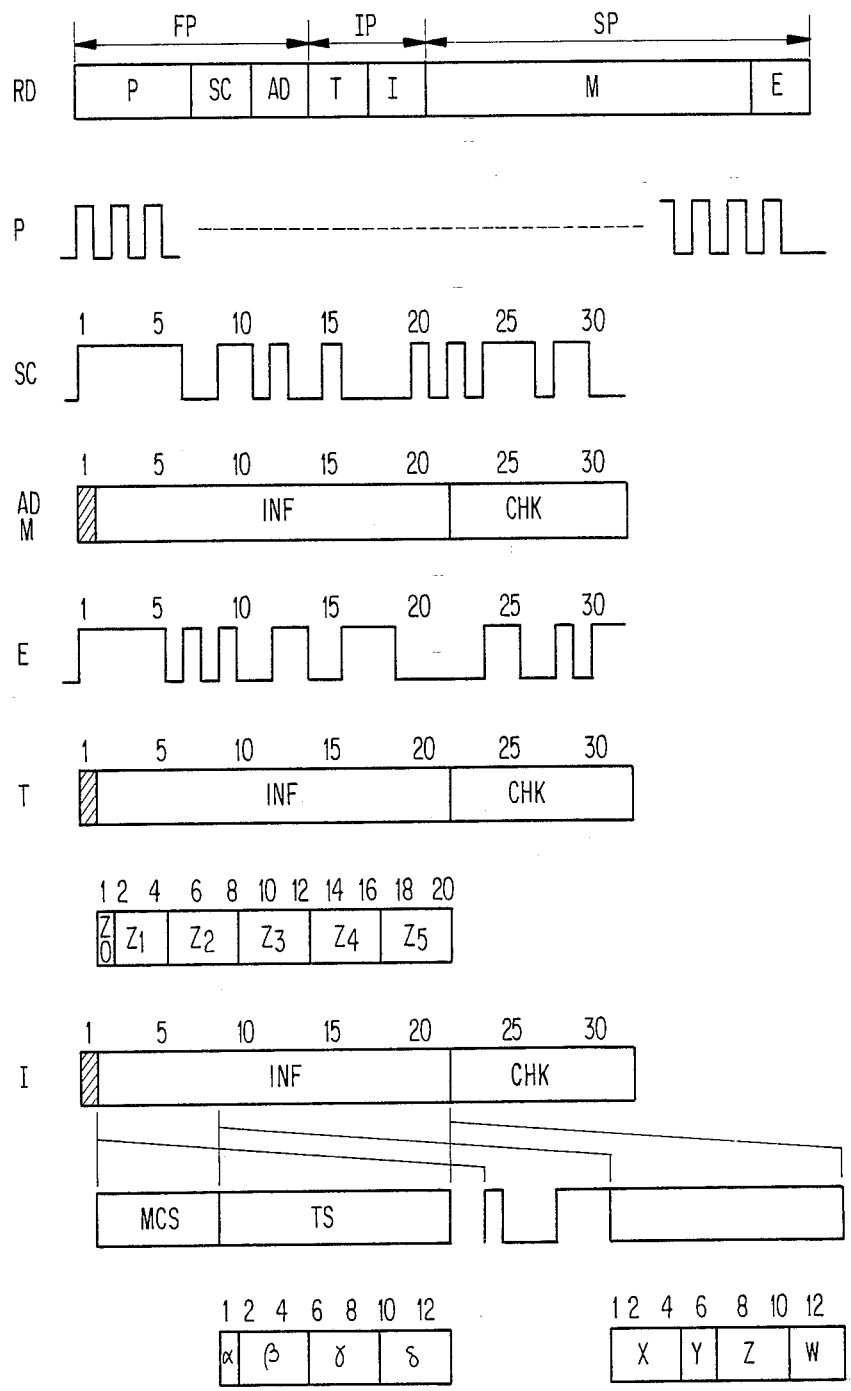
FIG. 1 shows a signal format for use in describing a call signal received by a pager receiver according to this invention.

DESCRIPTION OF THE PREFERRED EMBODIMENTS:

Referring to FIG. 1, description will be made of a call signal RD which is received by a pager receiver included in a paging system related to this invention. The call signal RD is given in the form of a radio signal and therefore will be called a radio call signal. As shown along the top line of FIG. 1, the illustrated call signal RD is divisible into a first part FP, a second part SP spaced apart from the first part FP, and an intermediate part IP interposed between the first and second parts FP and SP. As will later be described, the intermediate part IP is particular to this call signal and therefore novel.

The first part FP comprises a preamble signal P of 62 bits, a synchronization signal SC of 31 bits, and an address signal AD of 31 bits. The preamble signal P is specified by a repetition of pulses, as illustrated along the second line of FIG. 1 while the synchronization signal SC is specified by a fixed patter exemplified along the third line labelled SC. The synchronization signal SC is represented by a BCH (Bose-Chaudhuri-Hocquenghem) code of (31, 21) which is well known in the art.

In addition, the synchronization signal SC is followed by the address signal AD which consists of the BCH code of (31, 21), like the synchronization signal SC, and which is for calling or addressing pager receivers of the paging system. The address signal AD may therefore be referred to as a calling number signal and is arranged from a most significant bit (MSB), namely, first bit "1" to a least significant bit (LSB), namely, thirty-first bit "31." The first bit serves to identify the address signal AD when given a logic "0" level. The second through twenty-first bits of the address signal AD are for disposing an information signal INF while the remaining bits from the twenty-second bit to the thirty-first bit are for arranging a check signal CHK.

The second part SP comprises a message signal M representative of a message which may be variable in length. Therefore, the message signal M is also variable in length. The message signal M comprises at least one message unit signal which is represented by the BCH code of (31, 21), like the address signal AD. As depicted along the fourth line of FIG. 1, each message unit signal is distinguished from the address signal AD by giving the logic "1" level to the first bit (MSB). The message carried by each message unit signal may be numerical information, character information, or facsimile information. The numerical information may be represented, for example, by a binary coded decimal notation. The character information may be either of an ASCII which is an abbreviation of American Standard Code for Information Interchange or of a JIS code which is an abbreviation of Japanese Industrial Standard.

The message signal M is followed by an end signal E of 31 bits having an additional fixed pattern which is different from the fixed pattern of the synchronization signal SC, as depicted along the fifth line of FIG. 1.

In FIG. 1, the illustrated intermediate part IP comprises a first control part of 31 bits and a second control part of 31 bits following the first control part. The first and second control parts are for arranging first and second control signals as depicted at T and I in FIG. 1, respectively, and are processed as the message signal M. In this connection, each of the first and second control signals and I is specified by the logic "1" level placed at the first bit (MSB) and comprises an information area INF of 20 bits and a check area CHK of 10 bits, like the message signal M.

As shown along the sixth and seventh lines of FIG. 1, the information area INF of the first control signal T is divisible into zeroth through fifth fields $Z_0$ to $Z_5$. The zeroth field $Z_0$ of a single bit is for representing whether the message signal M is present or absent. Specifically, the logic "1" and "0" levels are placed at the zeroth field $Z_0$ when the message signal M is present and absent in the second part SP of the call signal RD, respectively.

The first field $Z_1$ of three bits is for designating a form of the message signal M received after the first control signal T. For example, the numerical information, the character information of the ASCII, the character information of the JIS code, and the facsimile information are specified by giving, to the three bits of the first field $Z_1$, code of "001," "100," and "111," respectively.

The remaining fields $Z_2$ to $Z_5$ are for arranging a time interval signal representative of a length of the message signal M following the first control signal T. More specifically, the second through fifth fields $Z_2$ to $Z_5$ are for disposing a length which is selected from a length of the message signal M succeeding the instant first control signal T and distances or lengths to a synchronization signal, a first control signal, and a second control signal which are all included in the next one of the call signals (not shown), respectively. The selected length may be measured by counting the number of words each of which consists of thirty-one bits. The number of words is represented by the binary coded decimal notation.

As illustrated along the eight through tenth lines of FIG. 1, the information area of the second control signal I is divisible into front and rear sections for arranging a message control signal (MCS) of seven bits and a time signal (TS) of thirteen bits, respectively. The time signal (TS) is representative of a time, such as hour and minute.

A wide variety of services have been proposed in the paging system. For example, a specific service may be performed to announce a stock price of a certain company to many unspecified persons enjoying the specific service. In this event, a common identification number (ID) is assigned so as to specify the company and may be used by the unspecified persons in common. Such a common identification number should often be registered, altered, or cancelled in each individual pager receiver. Registration, alteration, and cancellation of the common identification number are very troublesome.

In addition, time information may be transmitted to indicate a time instant and may be stored together with the message signal. Furthermore, various messages may be displayed in the form of a telephone directory or a memorandum when each possessor manipulates the pager receiver.

The above-exemplified services or operations may readily be realized by the use of the second control signal I. For this purpose, the above-described message control signal (MCS) is indicative of the services or operations as mentioned above. A relationship between the message control signal (MCS) and the services or operations is tabulated in Table 1.

TABLE 1

| Item | "MCS" Pattern | Corresponding Operations |
|------|---------------|--------------------------|
| 1 | 1010101 | Normal processing operation |
| 2 | 1000001 | Registering as common ID |
| 3 | 1000010 | Alteration of common ID |
| 4 | 1000011 | Setting alert at an indicated time instant |
| 5 | 1000100 | Allocation of memory areas |
| 6 | 1000101 | Setting a period for supervising a stay in an external zone |
| 7 | 1000110 | Indication of telephone directory form |
| 8 | 1000111 | Interpreting TS as information of month and date |

TABLE 1-continued

| Item | "MCS" Pattern | Corresponding Operations |
|---|---|---|
| 9 | 1001000 | Indication of memorandum form |

A brief description will be provided with regards Table 1. In Table 1, operations are exemplified and enumerated as first through ninth items, respectively, and made to correspond to patterns of the message control signal (MCS). The first item is for processing a reception message following the second control signal I in a usual manner. In other words, any specific operations are not carried out on reception of the pattern of the message control signal (MCS) corresponding to the first item. The second and third items serve to indicate registration and alteration of a common identification number (ID), respectively. The fourth item is for producing an alert at the time instant indicated by a reception message. To this end, an internal clock of a pager receiver is set at the indicated time instant. The fifth item is for allocating a necessary memory area to a reception message in response to an identification number and a byte signal. The sixth item is for supervising a stay of a processor in an external zone laid outside of a service zone by measuring no reception of the synchronization signal SC during a predetermined interval of time, as will become clear as the description proceeds. An indication may be made to inform the possessor of lapse of the predetermined duration and may be different from the alert produced for the fourth item. The seventh and ninth items are for arranging reception messages in the forms of a telephone directory and a memorandum exemplified in Tables 2 and 3, respectively.

TABLE 2

| NAME | Corp. | No. |
|---|---|---|
| AOKI | NEC | 03-262-5174 |
| KUDO | SONY | 03-452-6312 |
| ENDO | KDD | 03-225-1111 |
| MIKI | NTT | 045-378-1532 |
| U | | 06-333-5594 |

TABLE 3

| FEB. 10, 1984 SCHEDULE | |
|---|---|
| 9:00 | MEETING (NEW PRODUCT) AT 5-1 |
| 10:30 | TEL (NTT MR. KUDO) |
| 13:00 | EDUCATION (FRESHMEN) |
| 15:00 | INTERNATIONAL CONFERENCE |
| 18:00 | GINZA (MORE) |

The eighth item is for interpreting the time signal (TS) as a date signal representative of month and date. Specifically, the time signal (TS) has first, second, third, and fourth time fields $\alpha$, $\beta$, $\gamma$, and $\delta$, as shown in FIG. 1. The first time field $\alpha$ of the time signal (TS) is for distinguishing between A.M. and P.M. while the second time field $\beta$ is for arranging "hour" information, as listed in Table 4. Likewise, the third and fourth time fields $\gamma$ and $\delta$ are for arranging a tenth digit or a digit of the ten's place and a unit digit of "minute" information, respectively.

TABLE 4

| | TIME SIGNAL |
|---|---|
| $\alpha$ | "0" ... AM, "1" ... PM |
| $\beta$ | "HOUR" INFORMATION (0~12) |
| $\gamma$ | TENTH DIGIT OF MINUTE |

TABLE 4-continued

| | TIME SIGNAL |
|---|---|
| $\delta$ | UNIT DIGIT OF MINUTE |

On reception of the pattern of the eighth item, the time signal (TS) is changed to the date signal as listed in Table 5. The date signal has first, second, third, and fourth date fields X, Y, Z, and W, as shown in FIG. 1.

TABLE 5

| | DATE SIGNAL |
|---|---|
| X | "MONTH" INFORMATION (1~12) |
| Y | TENTH DIGIT OF "DATE" (0~3) |
| Z | UNIT DIGIT OF DATE (1~9) |
| W | "DAY OF THE WEEK" |

As is enumerated in Table 5, the first field X is for arranging "month" information while the second and third fields Y and Z are for arranging tenth and unit digits of "date" or the day of the month information, respectively. The fourth field W is for disposing "day of the week" information.

Figure 2:
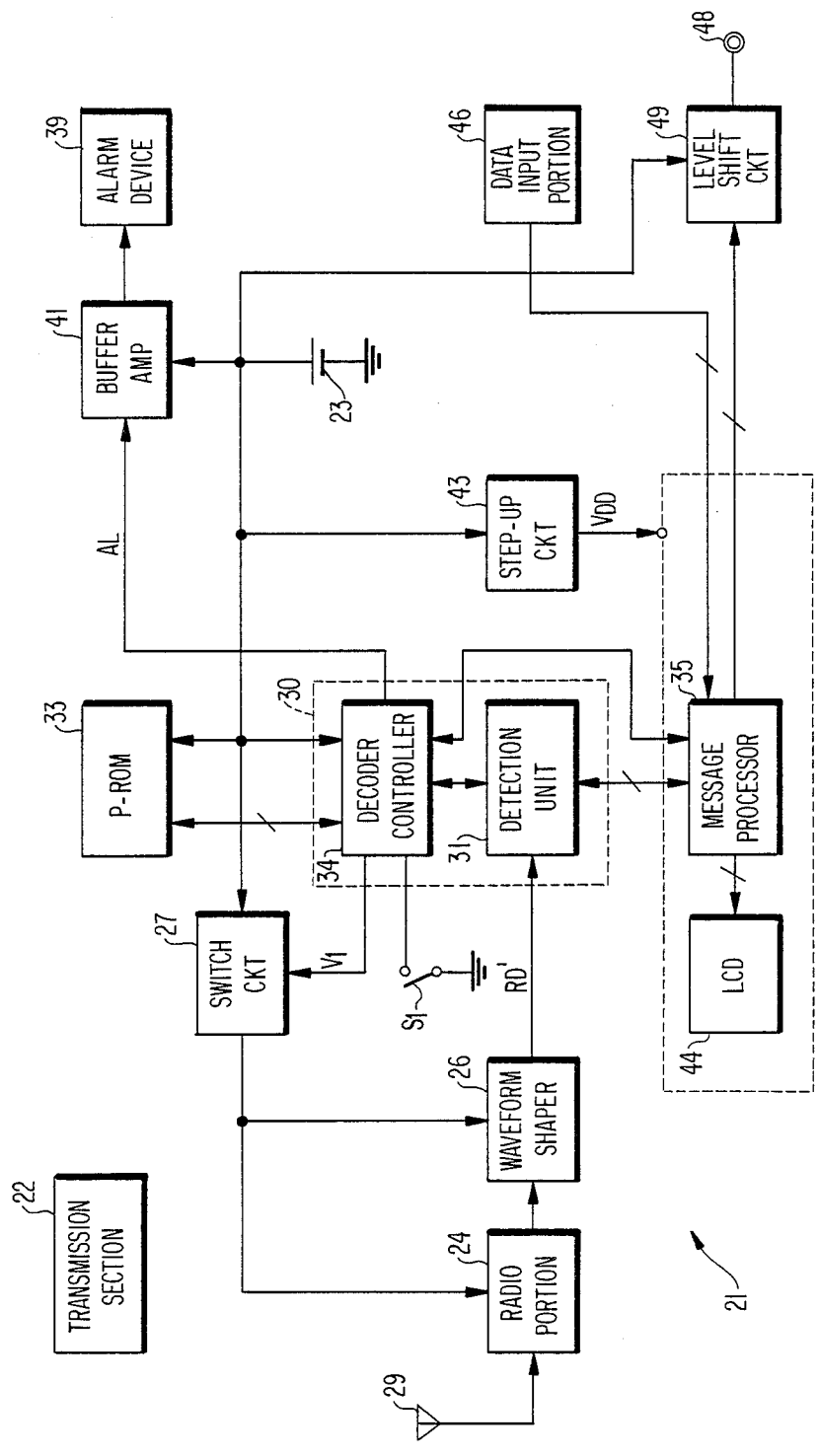
FIG. 2 is a block diagram of the pager receiver according to a first embodiment of this invention.

Referring to FIG. 2, a pager receiver 21 according to a first embodiment of this invention is operable in response to the radio call signals RD of the format illustrated in FIG. 1. The radio call signals RD are transmitted from a transmitting station 22 to the pager receiver 21. For convenience of description, a first call number is preassigned to the illustrated pager receiver which will be called a first pager receiver. Second through N-th pager receivers (not shown) are assumed to be present together with the first pager receiver 21 in the paging system and to be assigned with second through N-th call numbers, respectively. Although description is restricted to the illustrated pager receiver 21, similar operation is carried out in the other pager receivers.

The illustrated pager receiver 21 is driven by battery 23 for providing a source voltage B of, for example, 1 volt. The electric voltage B is delivered to a radio portion 24 and a waveform shaper 26 through a switch circuit 27 which will later be described in detail. For the time being, it may be understood that the switch circuit 27 serves to intermittently supply the source voltage B to the radio portion 24 and the waveform shaper 26. As a result, both of the radio portion 24 and the waveform shaper 26 are put into an operating mode only during supply of the source voltage B and, otherwise, put into a nonoperating mode. Thus, battery saving operation is carried out when no call signal is received by the illustrated pager receiver 21.

Thus, a combination of the radio portion 24 and the waveform shaper 26 serves to receive the call signals RD and to produce reception call signals representative of the call signals RD and may be called a reception circuit. It is to be noted that the operating and nonoperating modes can be modified in the illustrated pager receiver 21 in a manner which will be described later.

Figure 3A:
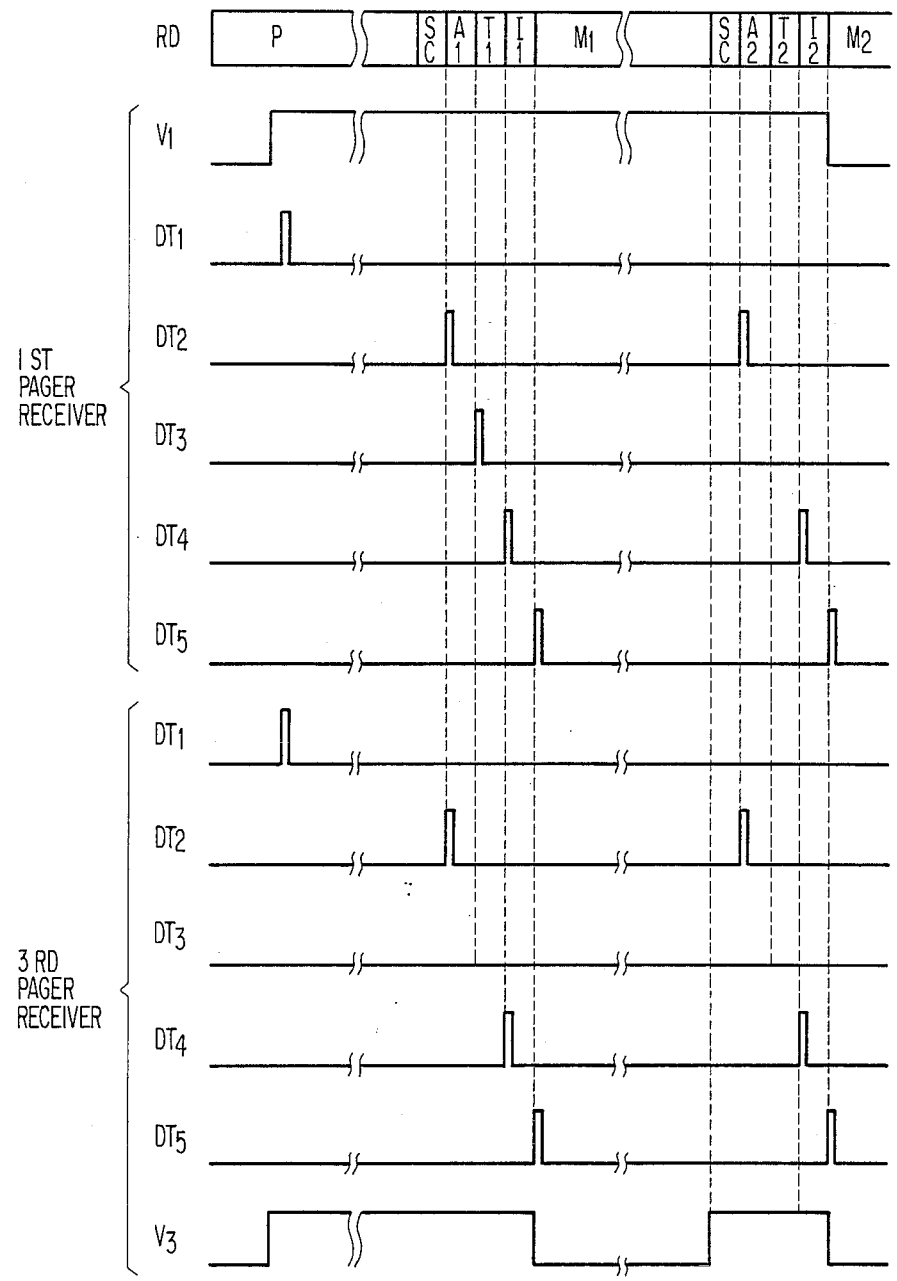
FIG. 3 (a) and (b) are time charts for use in describing operation of the pager receiver illustrated in FIG. 2.
Figure 3B:
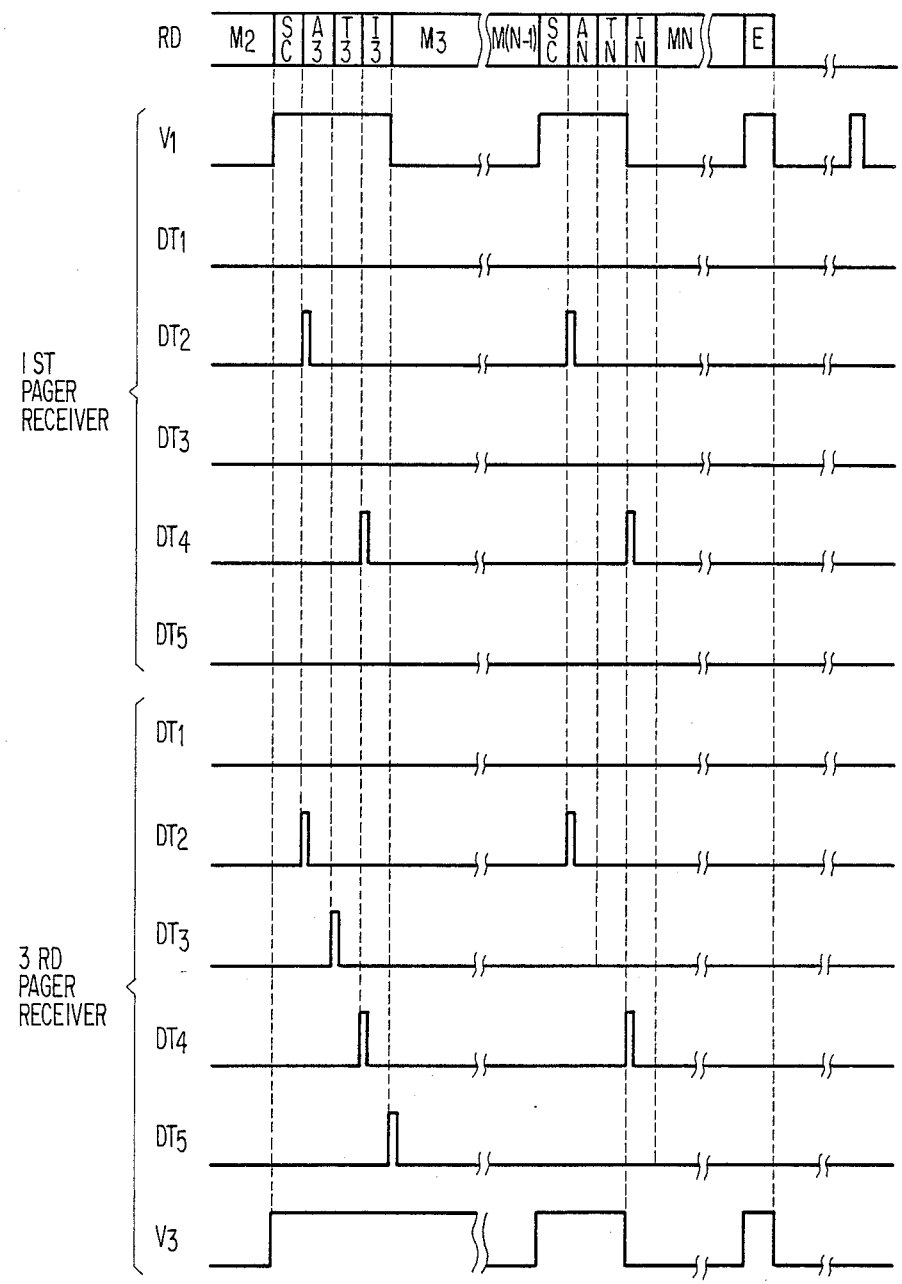

Referring to FIGS. 3(a) and 3(b) together with FIG. 2, let a radio call signal RD be transmitted from the transmitting station 22, as illustrated in FIGS. 3(a) and 3(b) along the top line thereof. The illustrated radio call signal RD is similar to that shown in FIG. 1 except that the radio call signal RD of FIGS. 3(a) and (b) conveys message signals destined to the first through N-th pager receivers, respectively. In this connection, suffixes 1 through N are attached to the address signals A, the first control signals T, the second control signals I, and the message signals M. From this fact, it is seen that the address signals $A_1$ through $A_N$ and the message signals $M_1$ through $M_N$ are to be received by the first through N-th pager receivers, respectively.

In FIGS. 3(a) and 3(b), description will be made as regards the first and third pager receivers which have the first and third preassigned call numbers corresponding to the call number signals $A_1$ and $A_3$, respectively. For brevity of description, it is assumed for a short while that a power switch (not shown) is closed in each pager receiver by each possessor. The radio call signal RD of FIGS. 3(a) and (b) is received through an antenna 29, the radio portion 24, and the waveform shaper 26 to a decoder 30 as the reception call signal in each of the first and third pager receivers, while the radio portion 24 and the waveform shaper 26 are put into the operating mode. The reception call signal corresponds to the radio call signal RD and will therefore be designated as RD'.

During closure of the power switch, the source voltage B is continuously delivered to the decoder 30. The decoder 30 is therefore continuously driven by the electric voltage B to receive and detect the call signal RD. The decoder 30 is for decoding or detecting the reception call signals RD' in a manner to be presently described.

More specifically, the reception circuit of each pager receiver carries out a battery saving (BS) operation before reception of the reception call signal RD'. During the battery saving operation, the reception circuit is repeatedly and intermittently put into the operating and the nonoperating modes. Under the circumstances, let the preamble signal P of the reception call signal RD' illustrated in FIG. 3(a) be detected during the intermittent operating mode by the decoder 30 of each of the first and third pager receivers, as depicted at $DT_1$ in FIG. 3(a). In this event, each pager receiver releases the battery saving operation to be continuously put into the operating mode as depicted at $V_1$ and $V_3$ in FIG. 3(a).

During the continuous operating mode, each decoder 30 of the first and third pager receivers detects the synchronization signal SC following the preamble signal P. The decoder 30 comprises a detection unit 31 comprising a preamble signal detector and a synchronization signal detector for detecting the preamble and the synchronization signals, respectively. In addition, the detection unit 31 comprises an end signal detector for detecting the end signal E shown in FIGS. 1 and 3(b). The preamble signal detector, the synchronization signal detector, and the end signal detector are disclosed by this inventor in U.S. Pat. No. 4,613,859 assigned to the same assignee and will not be described any longer. Thus, the detection unit 31 may be similar to that illustrated in the above-referenced application.

When the synchronization signal SC is detected in each of the first and third pager receivers, as illustrated at $DT_2$ in FIG. 3(a), each decoder 30 of the first and third pager receivers accesses a programmable read-only memory (PRO) 33 to read a call number signal specific to each pager receiver and representative of each call number. As a result, the first and third call numbers are sent from the programmable read-only memory 33 to the decoder 30 in each of the first and third pager receivers. The above operation is carried out under control of a decode controller 34 included in each pager receiver.

Inasmuch as the address signal $A_1$ follows the synchronization signal SC and corresponds to the first call number, the decoder controller 34 of the first pager receiver 21 detects coincidence between the first call number signal and the address signal $A_1$, as illustrated at $DT_3$ in the upper half of FIG. 3(a).

On the other hand, noncoincidence is detected between the third call number signal and the address signal $A_1$ in the decoder controller 34 of the third pager receiver, as shown at $DT_3$ in the lower half of FIG. 3(a).

On detection of the coincidence between the first call number signal and the address signal $A_1$, the decoder controller 34 of the first pager receiver 21 supplies a message processor 35 with a detection signal $DT_3$ representative of detection of the address signal $A_1$. As a result, the message processor 35 is operable to process the following message signal $M_1$. Concurrently, the decoder controller 34 delivers an alert signal AL to an alarm device 39, such as a loudspeaker, through a buffer amplifier 41.

On detection of the noncoincidence, the message processor 35 does not process the message signal as in the third pager receiver.

In FIG. 2, the message processor 35 is operable at a high speed in comparison with the decoder 30 and must be supplied with a drive voltage $V_{DD}$ higher than the source voltage B of the battery 23. In this connection, the source voltage B is elevated or increased to the drive voltage $V_{DD}$ by a step-up circuit 43 (FIG. 2). The drive voltage $V_{DD}$ may be higher than the source voltage B by two volts or more. The drive voltage is delivered to a liquid crystal display (LCS) 44 which may be dynamically driven in a known manner and which cooperates with the message processor 35. In other words, the drive voltage is supplied to both the message processor 35 and the liquid crystal display 44 in common. Taking the above into consideration, the message processor 35 and the liquid crystal display 44 are surrounded by a single dot-and-dash line block. In addition, the message processor 35 is coupled to a data input portion 46 and an output terminal 48 through a level shift circuit 49, as will become clear as the description proceeds.

Referring back to FIG. 3(a), the first control signal $T_1$ is received by each pager receiver after detection of the address signal $A_1$. It is to be noted here that the operating mode lasts even on detection of noncoincidence between the address signal $A_1$ and the call number signal, as illustrated at $V_3$. Accordingly, the first and second control signal $T_1$ and $I_1$ are detected by each decoder 30 of the first and third pager receivers, as depicted at $DT_4$ and $DT_5$ in FIG. 3(a), respectively. After detection of the second control signal I, the third pager receiver is turned into the nonoperating mode which lasts until detection of the next following synchronization signal SC with reference to the first control signal $T_1$, as depicted at $V_3$.

As is readily understood from the description of FIG. 1, the first control signal $T_1$ carries presence or absence of a message signal, a species of the message signal, and a length of the message signal. In addition, the second control signal $I_1$ carries a message control signal (MCS) and a time (TS) or date signal, as mentioned in conjunction with FIG. 1.

Under the circumstances, the third pager receiver can know the length of the message signal $M_1$ destined to the first pager receiver 21 even when the noncoincidence between the address signal $A_1$ and the third call number signal is detected by the third pager receiver. This is because the operating mode lasts until the detection of the first control signal $T_1$, regardless of coincidence or noncoincidence of the address signal $A_1$. Furthermore, an internal clock (not shown) can be adjusted in the third pager receiver to the time or date signal carried by the second control signal $I_1$ when the operating mode lasts until the second control signal $I_1$.

Similar operation is carried out in the first pager receiver 21 in response to the first and second control signals $T_1$ and $I_1$. In this event, the decoder controller 34 of the first pager receiver 21 outlasts the operating mode, as illustrated at $V_1$, in contrast to that of the third pager receiver on condition that the address signal $A_1$ is detected. Specifically, the operating mode of the first pager receiver 21 lasts until arrival of the next following message signal $M_2$.

As mentioned before, the operating and nonoperating modes of each pager receiver are modified by the decoder controller 34 in dependency upon the first control signal $T_1$, namely, the length of the message signal $M_1$. To this end, the decoder controller 34 supplies the switching circuit 27 with a selection signal which is depicted at $V_1$ or $V_3$ in FIG. 3(a) and which is indicative of the operating and nonoperating modes.

Specifically, it is assumed that, during the battery saving operation, the operating mode lasts for a first interval of, for example, 60 milliseconds and is followed by the nonoperating mode lasting for an interval of, for example, 1005 milliseconds. The first interval is modified into a second interval which is longer than the first interval. The second interval is variable with the length of the message signal $M_1$ and the lengths of the preamble signal P, the synchronization signal SC, and the first and second control signals, such as $T_1$ and $I_1$, as is readily understood from FIG. 3(a).

After detection of the first and second control signals $T_1$ and $I_1$, the message processor 35 of the pager receiver 21 processes the message signal $M_1$ with reference to the first and second control signals $T_1$ and $I_1$ in a manner to be described later. The operating mode of the first pager receiver 21 is kept intact until the next following synchronization signal SC, address signal $A_2$, and first and second control signals $T_2$ and $I_2$ even when the message signal $M_1$ is completely processed by the message processor 35 of the first pager receiver 21.

Therefore, the first and third pager receivers become inactive for a duration indicated by the first control signal $T_2$, namely, the time interval signal. This means that the first and third pager receivers are put into the nonoperating mode while the message signal $M_2$ is processed by the second pager receiver (not shown).

Each of the first and third pager receivers is returned back to the operating mode after lapse of the duration indicated by the second control signal $T_2$, as shown at $V_1$ and $V_3$ in FIG. 3(b). When each of the first and third pager receivers is turned into the operating mode, the synchronization signal SC is received by the first and third pager receivers, following the message signal $M_2$.

The address signal $A_3$ illustrated in FIG. 3(b) is not destined to the first pager receiver 21 but to the third pager receiver. In this event, the first pager receiver 21 detects only the synchronization signal SC and the first control signal $T_3$ by the use of the decoder 30 thereof. Thereafter, the first pager receiver 21 is put into the nonoperating mode and therefore does not detect the second control signal $I_3$. Similar operation is carried out in the first pager receiver 21 until reception of the synchronization signal SC and the first control signal $T_N$ preceding the message signal $M_N$. Thus, it is readily understood that the illustrated time interval signal of the first control signal T indicative of a sum of the length of each message signal M and the length of each second control signal I.

On the other hand, the third pager receiver is put into the operating mode by counting the number of the words to the number indicated by the preceding first control signal $T_2$. The operating mode of the third pager receiver is kept until the following synchronization signal SC (not shown) and first control signal $T_4$ (not shown). This is because the address signal $A_3$ is destined to the third pager receiver. Subsequently, the third pager receiver is switched into the operating mode so as to detect only each synchronization signal SC and each first control signal T, like the first pager receiver 21.

When each pager receiver detects the end signal E with reference to the first control signal $T_N$ preceding the message signal $M_N$, the battery saving operation is started in each pager receiver again.

As illustrated in FIGS. 3(a) and 3(b), the operating mode initially lasts until reception of the second control signals $I_1$ and $I_2$ and thereafter, the operating mode lasts until reception of the first control signal, such as $T_3$ or $T_N$. Such control of the operating mode is readily possible by the decoder controller 35 of each pager receiver.

Figure 4:
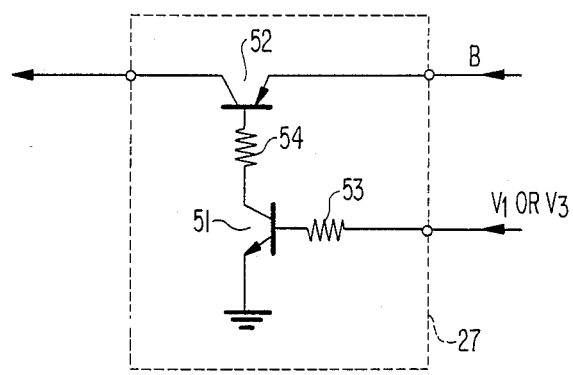
FIG. 4 is a circuit diagram of a switch circuit for use in the pager receiver illustrated in FIG. 2.

Referring to FIG. 4, the switch circuit 27 illustrated in FIG. 2 comprises a first transistor 51 and a second transistor 52 each of which are of an NPN and a PNP type. The base of the first transistor 51 is supplied with the selection signal $V_1$ or $V_3$ through a first resistor 53 while the emitter of the first transistor 51 is grounded. The collector of the first transistor 51 is coupled through a second transistor 54 to the base of the second transistor 52. The emitter of the second transistor 52 is given the source voltage B. With this structure, the drive voltage is delivered from the collector of the second transistor 52 in response to the selection signal $V_1$ or $V_3$. As a result, the radio portion 24 and the waveform shaper 26 are operated into the operating and nonoperating modes as depicted at $V_1$ and $V_3$ in FIG. 1.

Figure 5:
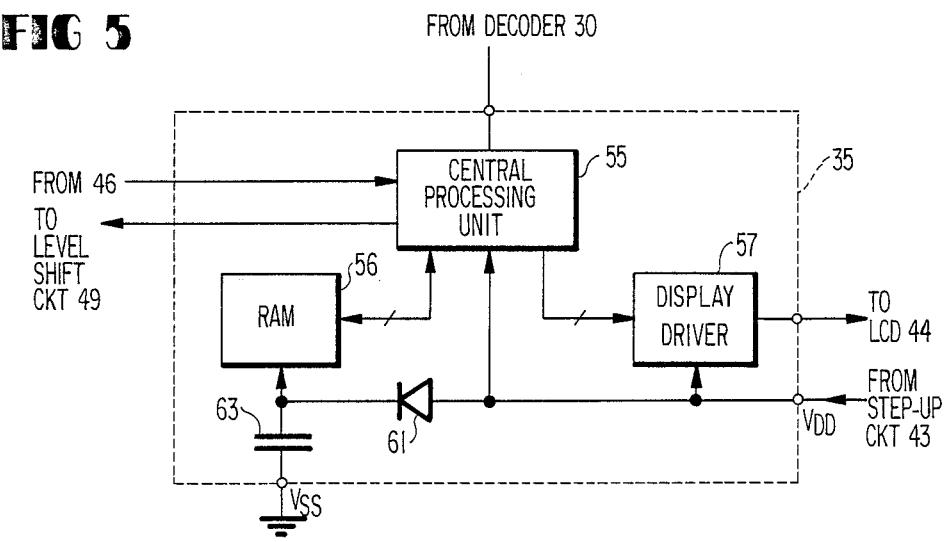
FIG. 5 is a block diagram of a message processor for use in the pager receiver illustrated in FIG. 2.

Referring to FIG. 5 together with FIG. 2, description will be directed to the message processor 35 and the liquid crystal display 44. In FIG. 5, the message processor 35 comprises a central processing unit (CPU) 55 which will be described later in detail in conjunction with FIG. 7, a random access memory (RAM) 56 storing each message signal, and a display driver circuit 57 for driving the liquid crystal display 44. The random access memory 56 has a plurality of areas each of which is for storing a single character of each message and that each message occupies the areas determined by the length of the message. A total number of the areas is equal, for example, to 500. Messages stored in the random access memory 56 will be referred to as files or filed messages.

Figure 6:
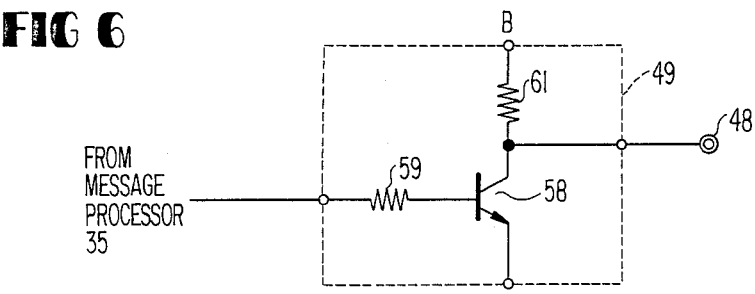
FIG. 6 is a circuit diagram of a level shift circuit for use in the pager receiver illustrated in FIG. 2.

Temporarily referring to FIG. 6, the files may successively be sent to an external device, such as a printer, a microcomputer, or the like, through the level shift circuit 49 illustrated in FIG. 6 and the output terminal 48. The level shift circuit 49 comprises a level shift transistor 58 of an NPN type having a base connected to the message processor 35 through a resistor 59 and a collector connected through another resistor 61 to the battery 23 and direct to the output terminal 48. When a data signal is supplied from the message processor 35 to the transistor 58, a level shifted output signal is sent to the output terminal 48 in the known manner.

Turning back to FIG. 5, the message processor 35 is supplied with the drive voltage $V_{DD}$ from the battery 23 through the step-up circuit 43. The battery 23 may be exchanged to another one some day. During exchange of the battery 23, the filed messages may undesiredly be removed from the random access memory 56. In order to avoid extinction of the filed messages, the illustrated message processor 35 comprises a diode 61 coupled to the step-up circuit 43 and a capacitor 63 connected to the diode 61 and the random access memory 56.

With this structure, the capacitor 63 is charged through the diode 61 by the battery 23 insofar as the battery 23 is connected to the message processor 35. Consequently, the filed messages are kept in the random access memory 56 by the drive voltage $V_{DD}$. When the battery 23 is disconnected from the message processor 35 and the drive voltage $V_{DD}$ is interrupted, and electric voltage is supplied from the capacitor 63 to the random access memory 56. As a result, the filed messages are kept in the random access memory 56 for a prescribed duration dependent on a capacitance of the capacitor 63. Thus, the filed messages of the random access memory 56 are backed up by a combination of the diode 61 and the capacitor 63 which may be referred to as a backup circuit.

Figure 7:
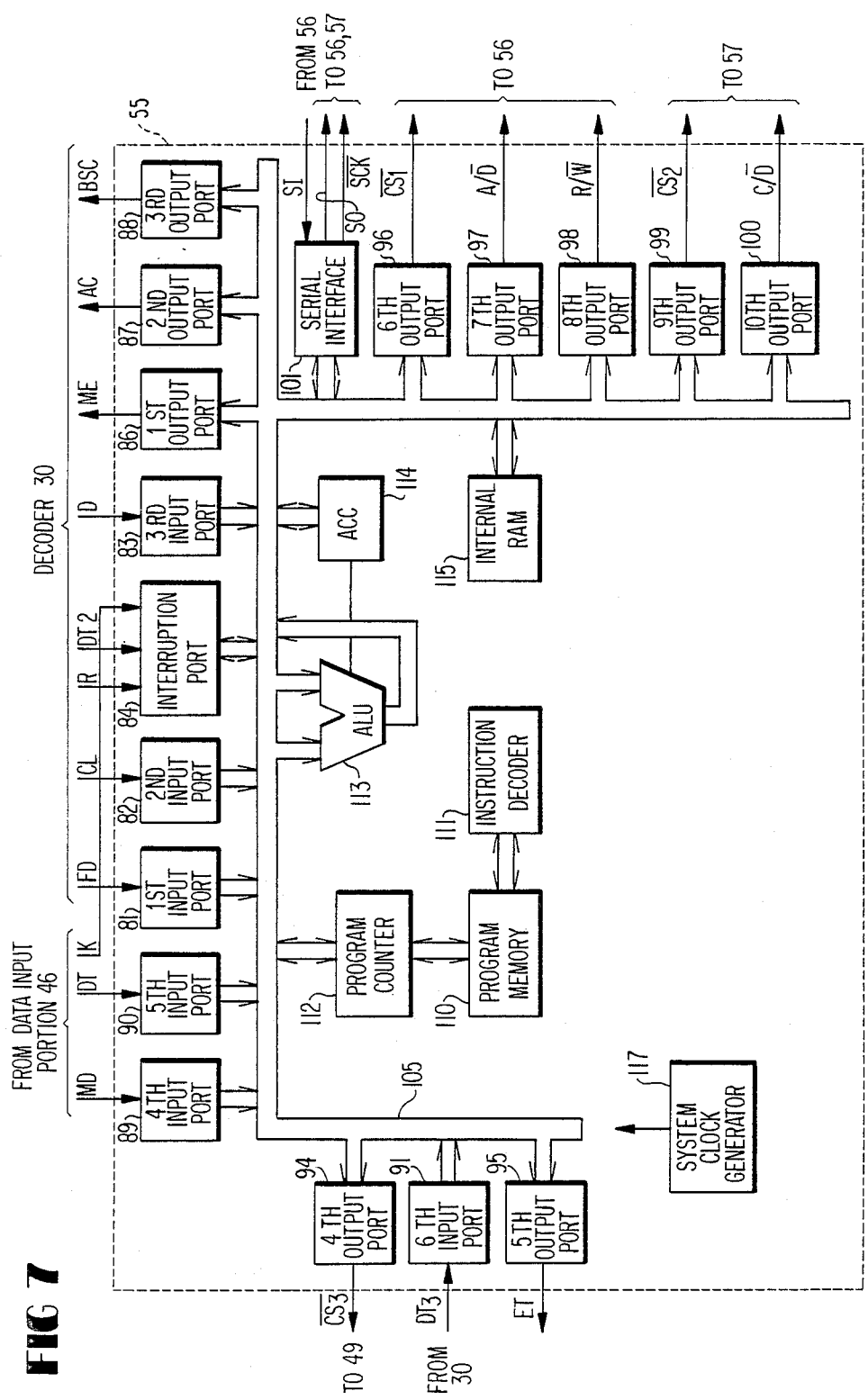
FIG. 7 is a block diagram of a central processing unit which is operable as the message processor illustrated in FIG. 5.

Referring to FIG. 7 together with FIG. 5, the central processing unit 55 of the message processor 35 may be of a single semiconductor chip and may be similar to that described by T. Mori et al in U.S. Pat. Application Ser. No. 655,287 filed September 28, 1984. The central processing unit 55 comprises first through third input ports 81, 82, and 83 and an interruption port 84, which are all coupled to the decoder 30 (FIG. 2). The first through third input ports 81 to 83 are supplied with frequency divided pulses FD, regenerated clock pulses CL, and message or data pulses D, which are sent from the decoder 30 in the manner described in the above-referenced application. The interruption port 84 is supplied with a detection signal which is representative of detection of the synchronization signal SC and which is represented by $DT_2$ like in FIGS. 3(a) and 3(b). Furthermore, a reset signal R and an external data signal K are supplied to the interruption port 84 from the decoder 30 and the data input portion 46, respectively.

First, second, and third output ports 86, 87, and 88 are included in the illustrated message processor 55 to be coupled to the decoder 30 and serve to deliver first, second, and third output signals ME, AC, and BSC to the decoder 30, as will become clear later.

The central processing unit 55 comprises fourth and fifth input ports 89 and 90 coupled to the data input portion 46 and a sixth input port 91 coupled to the decoder 30 so as to receive the detection signal $DT_3$ which is produced on detection of each address signal (FIGS. 3(a) and 3(b)). In addition, fourth and fifth output ports 94 and 95 are prepared in the illustrated central processing unit 55.

Furthermore, the central processing unit 55 further comprises sixth, seventh, and eighth output ports 96, 97, and 98 connected to the random access memory 56 and ninth and tenth output ports 99 and 100 connected to the display driver 57. A serial interface 101 is coupled to the random access memory 56 and the display driver 57 and is operable in a manner to be described later.

The above-mentioned elements, such as the ports and the interface, are coupled to an internal bus 105 laid in the central processing unit 55.

In FIG. 7, the central processing unit 55 further comprises a control or program memory 110, an instruction decoder 111, a program counter 112, an arithmetic and logic unit (ALU) 113, an accumulator (ACC) 114, an internal random access memory 115, and a system clock generator 117, which are all similar to those described in the above-referenced specification.

However, it is to be noted the illustrated central processing unit 55 carries out a message processing operation in response to the second control signal I illustrated in FIG. 1 in a manner to be described later.

Figure 8:
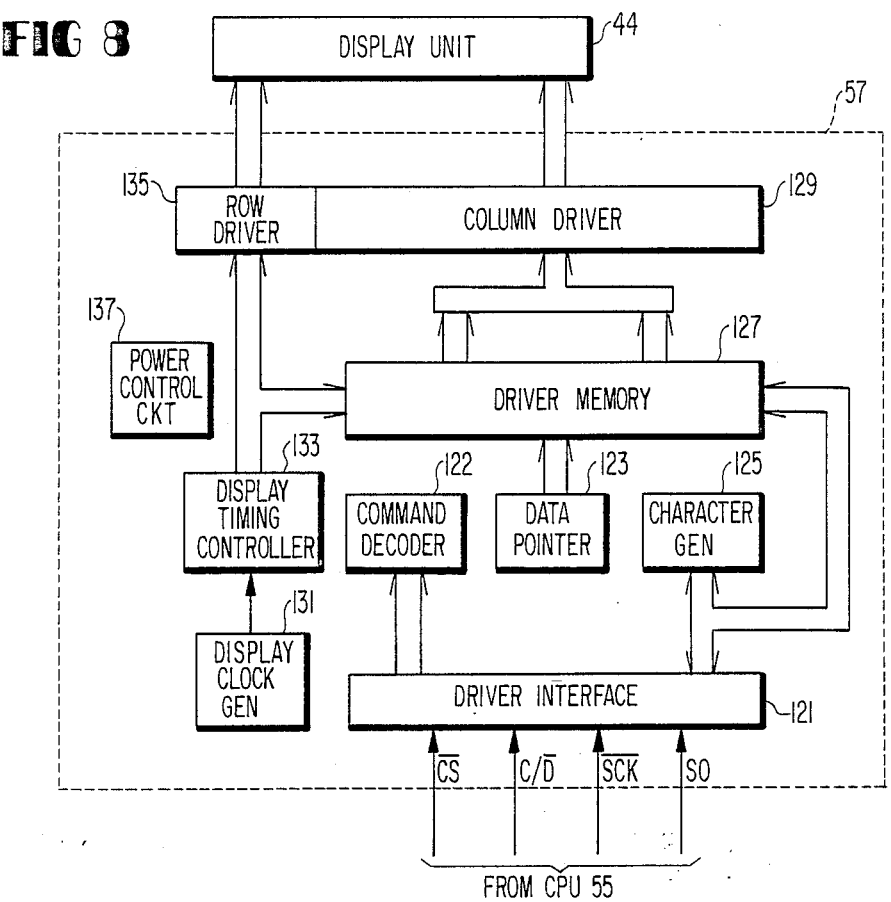
FIG. 8 is a block diagram of a display driver for use in the message processor illustrated in FIG. 5.

Referring to FIG. 8, the display driver 57 illustrated in FIG. 5 comprises a driver interface 121 connected to the central processing unit 55 illustrated in FIG. 7, a command decoder 122, a data pointer 123, a character generator 125, a driver memory 127, a column driver 129, a display clock generator 131, a display timing controller 133, a row driver 135, and a power control circuit 137, which are all described in the above-referenced patent application.

Figure 9:
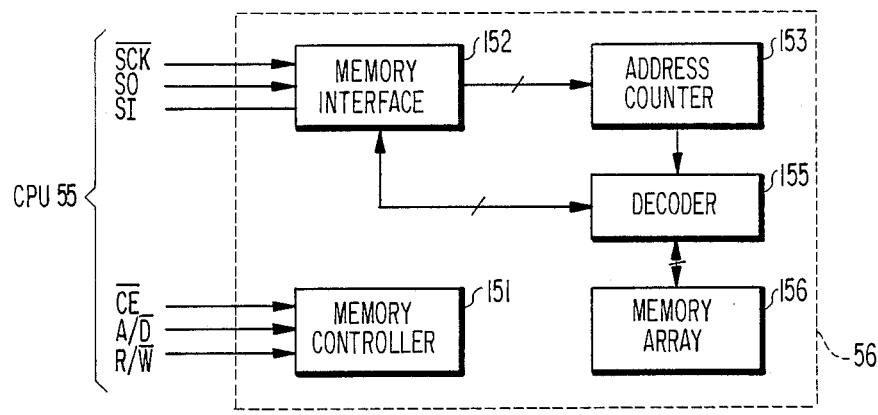
FIG. 9 is a block diagram of an external random access memory operable as a part of the message processor illustrated in FIG. 5.

Referring to FIG. 9, the random access memory 56 of FIG. 5 comprises a memory controller 151, a memory interface 152, an address counter 153, a decoder 155, and a memory array 156, which are all similar to those illustrated in the above-referenced patent application.

Now, the message processing operation will be described as regards the pager receiver illustrated in FIGS. 2, 5, 7, 8, and 9 below.

(1) Message Processing Operation Carried Out On Reception Of A Call Signal After Closure Of The Power Switch It is assumed that the address signal $A_1$ is received by the first pager receiver 21 during the battery saving operation of the first pager receiver 21, as shown in FIG. 3(a). In this event, the synchronization signal SC, the address signal $A_1$, and the first control signal $T_1$ are successively detected in the manner described before. Inasmuch as the leftmost one $T_1$ of the first control signals is followed by the message $M_1$, the logic "1" level is given to the zeroth field $Z_0$ of the first control signal $T_1$, as shown in FIG. 1. The first pager receiver 21 releases the battery saving operation during the first interval indicated by the second through fifth fields $Z_2$ to $Z_5$. The first interval lasts until reception of the next following first and second control signals $T_2$ and $I_2$. Alternatively, the first interval may last until reception of the next following synchronization signal SC.

On the other hand, the decoder 30 (FIG. 2) supplies the central processing unit 55 (FIG. 7) with the detection signal $DT_2$ when the synchronization signal SC is detected by the decoder 30. The detection signal $DT_2$ is sent through the interruption port 84. Simultaneously, the decoder 30 accesses the programmable read-only memory 33 to collate the address signal $A_1$ with the first call number signal in the known manner. When coincidence is detected between the address signal $A_1$ and the first call number signal, the detection signal $DT_3$ is delivered from the decoder 30 to the sixth input port 91 (FIG. 7) of the central processing unit 55. In this event, a sequence of clock pulses CL is delivered from the decoder 30 to the second input port 82 (FIG. 7) in the manner mentioned in the above-referenced patent application. The clock pulse sequence CL has a repetition frequency identical with a bit rate of each message signal.

The illustrated central processing unit 55 monitors reception of the detection signal $DT_3$ after the detection signal $DT_2$ is given to the central processing unit 55. If the detection signal $DT_3$ is received when a prescribed time of interval lapses after reception of the detection signal $DT_1$, the central processing unit 55 judges that coincidence is detected by the decoder 30 and delivers, to the decoder controller 34, the third output signal BSC indicative of an extension of the operating mode, as illustrated in FIG. 3(a) in conjunction with the first pager receiver 21. The third output signal BSC may be referred to as a battery saving control signal. Otherwise, the central control unit 55 judges that noncoincedence is detected by the decoder 30 and delivers to the decoder controller 34 the battery saving control signal indicative of shortening the operating mode, as illustrated in FIG. 3(a) in conjunction with the third pager receiver.

At any rate, the first pager receiver 21 decodes the second control signal $I_1$ in each decoder 30 thereof after detection of the coincidence between the address signal $A_1$ and the first call number signal.

Let the message control signal (MCS) of the second control signal $I_1$ have the pattern of "1000111" identical with the eighth item of Table 1. The decoder 30 decodes the message signal M with reference to the first field $Z_1$ of the first control signal $T_1$. Consequently, the message signal M is decoded into the message pulses D having a code form indicated by the first field $Z_1$ of the first control signal $T_1$. The message pulses D are sent through the third input port 83, the serial interface 101 (FIG. 7) of the central processing unit 55, and a serial output line SO to the random access memory 56 (FIGS. 5 and 9) of the message processor 35 under control of the instruction decoder 111. Subsequently, the message pulses D are displayed on the liquid crystal display 44 (FIGS. 5 and 8) through the display driver 57.

In addition, the decoder controller 34 delivers the alert signal AL to the alarm device 39 through the buffer amplifier 41. An alarm or audible tone signal is produced to inform the possessor of reception of the above-exemplified pattern.

The exemplified pattern of "1000111" is indicative of the fact that the following time signal TS of the second control signal $I_1$ is to be interpreted as "date of the month" information, as shown in Table 1. Accordingly, an internal calendar is corrected in the central processing unit 55 in response to the "date of the month" information received. Thus, the internal calendar is adjusted to a correct month and date. The internal calendar may be memorized in the program memory 110.

Similar operation is carried out in the third pager receiver also even when the address signal $A_1$ is not coincident with the third call number signal. Therefore, the internal calendar of the third pager receiver is set to the received "date of the month" information.

Thereafter, each of the first and third pager receivers decodes and detects the following synchronization signal SC, address signal $A_2$, and first and second control signals $T_2$ and $I_2$. However, coincidence between the address signal $A_2$ and each of the first and third call number signals can not be detected in each of the first and third pager receivers. No detection signal $DT_3$ is therefore given from the decoder 30 to the central processing unit 55. Each of the first and third pager receivers detects only the second through fifth fields $Z_2$ to $Z_5$, the message control signal (MCS), and the time signal (TS). After detection of the second control signal $I_2$, each of the first and third pager receivers is switched into the nonoperating mode which is kept for a duration indicated by the second through fifth fields of the first control signal $T_2$. If the message control signal (MCS) has a pattern except for "1000111," an internal clock is stored in the program memory 110 and is adjusted to the time signal (TS). A reception time instant ("hour and minute") is added to the message pulses stored in each pager receiver.

The nonoperating mode lasts in each of the first and third pager receivers before reception of the next synchronization signal SC. The synchronization signal SC, address signal $A_3$, and first control signal $T_3$ are detected in the above-mentioned manner in each of the first and third pager receivers.

In the first pager receiver 21, coincidence can not be detected between the address signal $A_3$ and the first call number signal. Besides, the internal clock of the first pager receiver 21 was already corrected or adjusted by reception of the second control signal $I_2$. Therefore, no adjustment of the internal clock is necessary in the first pager receiver 21 on reception of the second control signal $T_3$. Taking this into consideration, the first pager receiver 21 is switched into the nonoperating mode before the second control signal $I_3$. In other words, the operating mode is shortened once the adjustment of the internal clock is finished with reference to the second control signal, such as $I_2$.

Responsive to the address signal $A_3$ and the first and second control signals $T_3$ and $I_3$, the third pager receiver detects coincidence between the address signal $A_3$ and the third call number signal and is put into the operating mode for a duration indicated by the second through fifth fields $Z_2$ to $Z_5$ of the first control signal $T_3$. The internal calendar or clock is adjusted in the third pager receiver in response to the second control signal $I_3$ like in the first pager receiver 21.

Subsequently, only the synchronization signal SC and the first control signal T are monitored in each of the first and third pager receivers without detection of the second control signal I. Such operation is carried out until detection of the end signal E.

As long as the end signal E is not received in each pager receiver, the first control signal T is monitored by the central processing unit 55, regardless of reception or nonreception of the synchronization signal SC. When the first control signal T is not correctly received, each pager receiver is forcibly kept in the operating mode for a predetermined duration of, for example, 1 minute. The synchronization signal SC is monitored in each pager receiver for the predetermined duration. Each pager receiver is returned back to the battery saving operation when the synchronization signal SC is not detected for the predetermined duration. If two of the synchronization signals SC are not continuously detected, an electric field may be weak or bad. In this event, each pager receiver may be returned back to the battery saving operation. Thus, it is possible to effectively use the battery and to carry out reception operation with a high reliability.

Herein, description will be directed to the processing operation of the first and second control signals T and I. In FIG. 7, each of the first and second control signals T and I is successively sent as the message pulses D from the detection unit 31 (FIG. 2) to the third input port 83 (FIG. 7) of the central processing unit 55. The first and second control signals T and I are stored in the internal random access memory 115. For this purpose, the internal random access memory 115 has an area for storing the first and second control signals T and I. The zeroth through fifth fields $Z_0$ to $Z_5$ of the first control signal T are successively read out of the internal random access memory 115 to be sent to the arithmetic and logic unit 113 and to be processed in accordance with a program stored in the program memory 110.

In the illustrated central processing unit 55 delivers the battery saving control signal BSC to the decoder controller 34 (FIG. 2) through the third output port 88 with reference to the detection signals $DT_2$ and $DT_3$ and to the first control signal T. Responsive to the battery saving control signal BSC, the decoder controller 34 (FIG. 2) supplies the selection signal, such as $V_1$, $V_3$, to the switch circuit 27. Thus, a combination of the decoder 30 and the message processor 35 may be called a selection signal producing circuit for putting the radio portion 24 and the waveform shaper 26 into the operating and nonoperating modes. The decoder controller 34 comprises a timer for measuring each time interval by successively counting each word, like in the referenced application.

(2) Processing Operation Carried Out When The Power Switch Is Closed During Reception Of A Call Signal Referring to FIG. 10 together with FIGS. 2 and 7, another operation will be described which is carried out when the power switch is closed to put the pager receiver into the operating mode. It is assumed that the pager receiver is assigned with the N-th address signal an and that the power switch is closed during reception of a call signal shown in FIG. 10.

Figure 10:
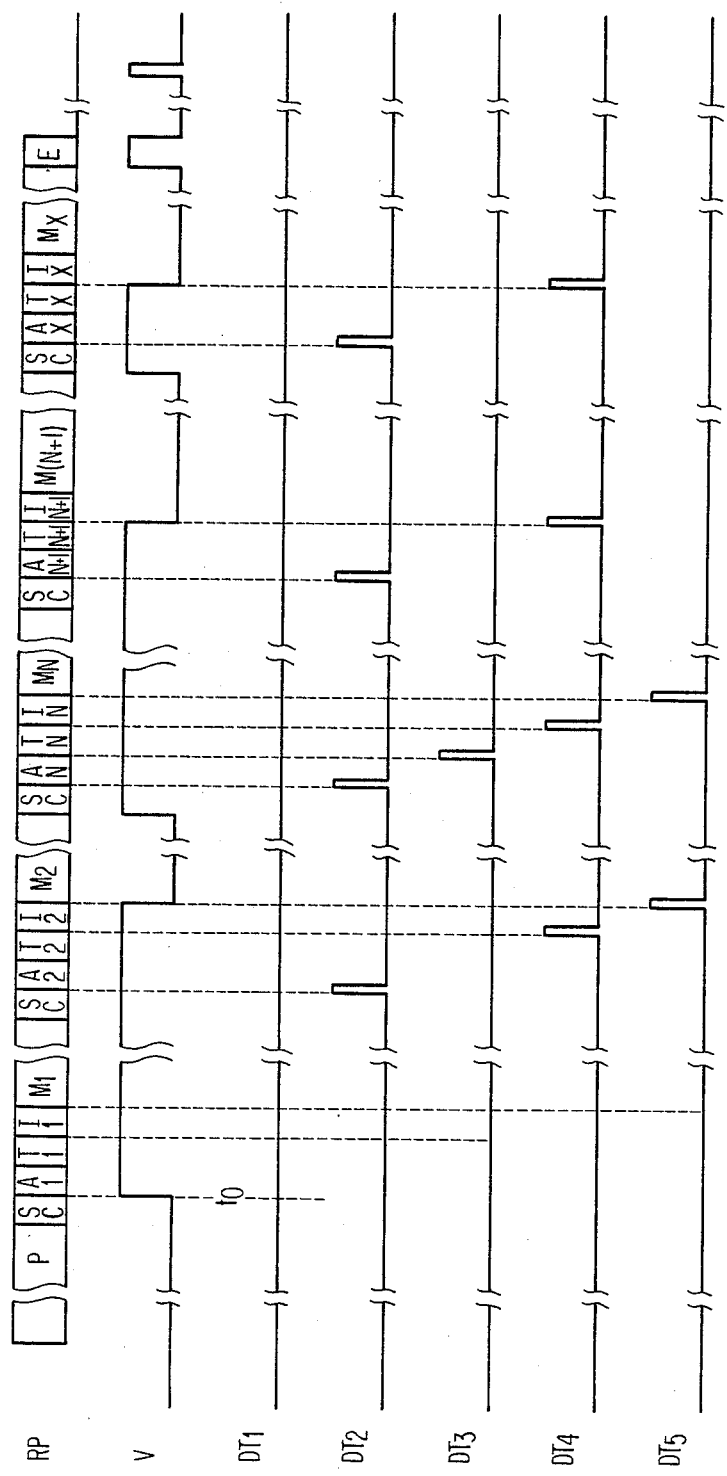
FIG. 10 is a time chart for use in describing another operation of the pager receiver illustrated in FIG. 2.

In FIG. 10, the power switch is closed at a time instant $t_0$ appearing after the leftmost one of the synchronization signals SC. This means that the pager receiver is put into an initial state. In such an initial state, the selection signal depicted at V is kept at a high level for a preselected interval of, for example, one minute. The decoder controller 34 detects the initial state and times the preselected interval.

The decoder 30 tries to detect the synchronization signal SC for the predetermined interval. However, the leftmost one of the synchronization signals SC illustrated in FIG. 10 is not detected by the decoder 30 of the pager receiver in question. Accordingly, the address signal $A_1$ and the first and second control signals $T_1$ and $I_1$ are not also detected by the decoder 30.

When the decoder 30 detects the synchronization signal SC following the leftmost one in the initial state, the address signal $A_2$ is compared with the N-th call number signal in the decoder 30 in the above-mentioned manner. In this case, the decoder 30 detects incoincidence between the address signal $A_2$ and the N-th call number signal and delivers the first and second control signals $T_2$ and $I_2$ to the central processing unit 55 of the message processor 35. The central processing unit 55 derives the time information signal from the second through fifth fields $Z_2$ to $Z_5$ of the first control signal $T_2$ to send the battery saving control signal BSC back to the decoder 30. In addition, the central processing unit 55 corrects the internal calendar and clock in response to the second control signal $I_2$ in the above-mentioned manner. Both of the internal calendar and clock may be stored in the program memory 110 (FIG. 7) and may be read out at predetermined periods, respectively. After correction of the internal calendar or clock, the pager receiver is switched into the nonoperating mode for the duration indicated by the time information signal.

Similar operation is repeated until the address signal $A_N$ is detected by the decoder 30 of the pager receiver. When the address signal $A_N$ is detected by the decoder 30, the central processing unit 55 delivers the battery saving control signal BSC to the decoder 30 with reference to the time information signal carried by the first control signal $T_N$. As a result, the pager receiver is put into the operating mode for a duration indicated by the time information signal.

After reception of the first control signal $T_N$, the central processing unit 55 receives the second control signal $I_n$. Let the message control signal (MCS) of the second control signal have the pattern of "1000101" corresponding to the sixth item of Table 1. In this case, the message signal $M_N$ is decoded into a decoded message signal by the decoder 30 to be sent to the random access memory 56 (FIG. 5). As shown in Table 1, the pattern of "1000101" monitors a staying time during which the possessor is staying outside of a favorable service area to produce an alarm or alert when the possessor stays outside of the favorable service area for a long time. Specifically, the staying time is indicated by the message signal $M_N$ following the above-mentioned second control signal $I_N$. The central processing unit 55 monitors lapse of time by the use of the internal clock when the synchronization signals SC are not received by the decoder 30. After lapse of the staying time indicated by the message signal $M_N$, the alarm is produced by the alarm device to draw attention of the possessor. Simultaneously, a timer is interrupted and the battery saving operation is restarted. Thereafter, the pager receiver is forcibly put into the operating mode for a duration of, for example, one minute to detect the synchronization signal SC. No detection of any synchronization signal SC results in return to the battery saving operation of the pager receiver.

(3) Manual Operation For Storage And Readout Of Information

Figure 11:
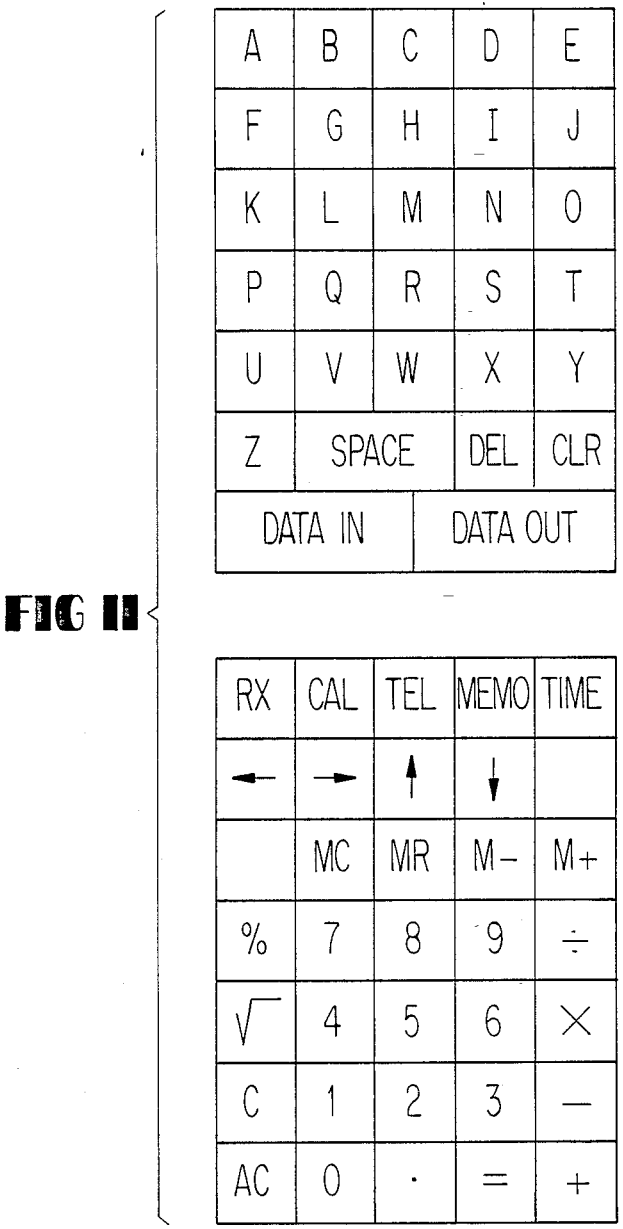
FIG. 11 is a plan view of a data input portion illustrated in FIG. 2.

Referring to FIG. 11 together with FIGS. 2, 7, 8, and 9, the data input portion 46 has a plurality of keys arranged in columns and rows as exemplified in FIG. 11. A plurality of mode keys, such as CAL, TIME, TEL, are included in the key arrangement. One of the mode keys is at first manually detected by the possessor. For example, selection of the "CAL" and "TIME" keys operates the liquid crystal display 44 as a portable calculator and a watch in cooperation with the central processing unit 55 of the message processor 35, respectively. Such operation is possible by the use of a known technique and will not be described any longer.

If the "TEL" key of the data input portion 46 is depressed, interruption is indicated from the data input portion 46 to the interruption port 84 of the central processing unit 55 through a K terminal of the interruption port 84. The fourth input port 89 is supplied with a preselected pattern MD corresponding to the "TEL" key. As a result, the central processing unit 55 recognizes that the pager receiver is set to a "TEL" mode and waits for a data signal supplied from the data input portion 46 through the fifth input port 90. The data signal is inputted by manipulating the keys like "DATA IN," "AOKI," "DATA IN," "NEC," "DATA IN," "03-262-5174," "DATA IN," "KUDO," "DATA IN," "SOY." The data signal is successively confirmed on the liquified crystal display 44 and stored in the random access memory 56 in the manner exemplified in Table 2. Thus, the data signal is memorized in the random access memory 56 like a telephone directory.

A readout operation of the data signal is carried out by depressing the "DATA OUT" key in the following. Depression of the "DATA OUT" key at first results in a display of "AOKI" on the liquid crystal display 44. The next depression of the right shift key "→" brings about a display of "NEC" and the further depression of "→" key makes the liquid crystal display 44 display "03-262-5174." When the right shift key "→" is pushed one more time, a display of "KUDO" is provided on the liquid crystal display 44. The next depression of the down shift key "↓" displays "ENDO" on the liquid crystal display 44. Anyway, each data signal can be displayed on the liquid crystal display 44 by depressing the "DATA OUT" key and the shift keys.

Let the mode key of "MEMO" be manually depressed. In this event, the central processing unit 55 detects interruption through the K terminal of the interruption port 84. The fourth input port 89 is supplied with a particular pattern which corresponds to the "MEMO" key and which may be, for example, "0010011." Thus, the central processing unit 55 judges that a "MEMO" mode is set. Thereafter, the central processing unit 55 receives the data signal DT through the fifth input port 90 and delivers the same to the random access memory 56 (FIG. 5). The data signal is memorized or inputted in the random access memory 56 in a manner similar to that described in conjunction with the "TEL" mode like a memorandum as exemplified in Table 3. Specifically, such input operation of the data signal is carried out like "DATA IN," "FEB. 10. 1984 Schedule," "DATA IN," "9:00,". . . . The memorandum exemplified in Table 3 can be readout and displayed on the liquid crystal display 44 by successively depressing the "DATA OUT" key and the shift keys in the manner described in conjunction with the "TEST" mode.

Inasmuch as the internal calendar and clock are prepared in the central processing unit 55, it is possible to monitor the dates and times listed on the memorandum. For example, the alarm device 39 and the display 44 are driven to draw the possessor's attention at "9:00," "10:30," "13:00," and the like of "Feb. 10, 1984." In this event, the liquid crystal display 44 displays "MEETING (NEW PRODUCT) AT 5-1" at 9:00.

(4) Registration Of Prescribed Information Carried By A Radio Call Signal

Referring to FIGS. 2, 7, 8, and 9 again, let the central processing unit 55 be supplied with the first control signal T as the message pulses D through the third input port 83 in synchronism with the clock pulses CL in the above-mentioned manner. The first control signal T is processed in accordance with an instruction read out of the program memory 110 and stored in the internal random access memory 115 through the data bus 105 and the accumulator 114. Subsequently, the first control signal T of the BCH code is decoded by the arithmetic and logic unit 113 into an information signal of 20 bits. Subsequently, the battery saving control signal BSC is sent through the third output port 88 to the decoder 30 in the above-mentioned manner.

It is assumed that the information signal of 20 bits has a pattern of "10100000000000100000." As is readily understood from FIG. 1, the pattern is indicative of the fact that the call signal in question includes a message represented by the ASCII code of seven bits and that the message signal lasts for a duration equal to 20 words. Accordingly, the pager receiver is kept in the operating mode for the duration, if the call signal is destined to the pager receiver in question.

Thereafter, the second control signal I is stored in the internal random access memory 115 in a manner similar to that described in conjunction with the first control signal T. Let the second control signal I have a pattern of "10001100101000100000." From Table and FIG. 1, it is seen that the above-exemplified pattern shows the following message is to be arranged in the form of a telephone directory as shown in Table 2 and the second call signal is produced at 20 minutes after ten (10:20) A.M.

The following message pulses D are decoded at every group of 31 bits in accordance with each instruction into a decoded message signal of 20 bits. The decoded message signal is interpreted at every group of seven bits to be stored in the random access memory 56 (FIGS. 5 and 9).

More specifically, the random access memory 56 is turned into an operation mode by sending through a signal line $\overline{CS}_1$ a chip selection signal of the logic "0" level from the central processing unit 55 to the random access memory 56. The central processing unit 55 delivers an address signal through a serial output line SO to the random access memory 56 through the serial interface 101. A system clock pulse is delivered on a signal line $\overline{SCK}$ to the random access memory 56 from the central processing unit 117. Concurrently, the logic "1" level is placed on a signal line $A/\overline{D}$ so as to specify transmission of the address signal.

Under the circumstances, the random access memory 56 (FIG. 9) monitors the signal lines $\overline{CS}$, $a/\overline{D}$, and $R/\overline{W}$ and detects that the address signal is given through the serial output line SO. The address signal is sent through the address counter 153 and the decoder 155 to the memory array 156.

Subsequently, the message pulses D are sent from the serial interface 101 through the serial output line SO with both of the signal lines $A/\overline{D}$ and $R/\overline{W}$ kept at the logic "0" level. As a result, the message pulses D are stored through the decoder 155 in the address of the memory array 156 specified by the address signal.

The message pulses D are successively decoded at every word of 31 bits by the central processing unit 55 in the above-mentioned manner. The central processing unit 55 judges that the message pulses D are finished, when the end signal E is detected by the decoder 30 or when two words are not continuously received. In this case, the central processing unit 55 informs the decoder 30 of completion of the message from the first output port 86 through a signal line ME. Concurrently, a tone generating circuit (not shown) of the decoder controller 34 is driven by the central processing unit 55 through the second output port 87 and a signal line AC. Thus, the alert signal AL is sent from the tone generating circuit to the alarm device 39 through the buffer amplifier 41.

On detection of the end signal E or nonreception of two continuous words, the battery saving operation is repeated again.

Thus, the message is stored in the random access memory 56 in the form of message codes indicated by a part of the first control signal T.

In the interim, let a readout switch $S_1$ (FIG. 2) be manually closed by the possessor so as to read the message codes stored in the above-mentioned manner out of the random access memory 56. The central processing unit 55 is enabled by the decoder 30 to supply the random access memory 56 through the serial output line SO with a first one of the address signals for the message codes. Simultaneously, signal lines $\overline{CS_1}$ and $\overline{CS_2}$ are supplied with the chip selection signal of the logic "0" level and another chip selection signal of the logic "1" level, respectively. The signal line $\overline{CS_2}$ is for use in selecting the display driver 57 by supplying the logic "0" level thereto. In addition, the signal line $A/\overline{D}$ is supplied with the logic "1" level.

Thereafter, the signal lines $A/\overline{D}$ and $R/\overline{W}$ are set into the logic "0" level and the logic "1" level, respectively. As a result, a first one of the message codes is read out of the first address of the memory array 156 through the decoder 155. The first message code is sent through a serial input line SI to the serial interface 101 of the central processing unit 55.

When the first message code is supplied to the central processing unit 55 in the above-mentioned manner, the signal lines $\overline{CS_1}$ and $C/\overline{D}$ are given the logic "1" level while the signal line $\overline{CS_2}$ is given the logic "0" level. The display driver 57 is thus selected by the central processing unit 55. Simultaneously, the display driver 57 is supplied through the serial output line SO with a character conversion indication and storage address information. The central processing unit 55 transmits the first message code to the display driver 57 through the serial output line SO by rendering the signal line $C/\overline{D}$ into the logic "0" level.

In the display driver 57 illustrated in FIG. 8, the first message code is supplied through the driver interface 121 to the character generator 125. The first message code is converted by the character generator 125 into a pattern of five-by-seven dots and thereafter stored into the driver memory 127. The pattern is displayed on the liquid crystal display 44 through the row and column drivers 135 and 129 under control of the display timing controller 133.

When the signal line $C/\overline{D}$ is given the logic "1" level, a command is supplied from the central processing unit 55 to the display driver 57. The command is delivered from the driver interface 121 to the command decoder 122 to be decoded into control signals (not shown).

(5) Registration And Alteration Of A Common Identification Number

Figure 12:
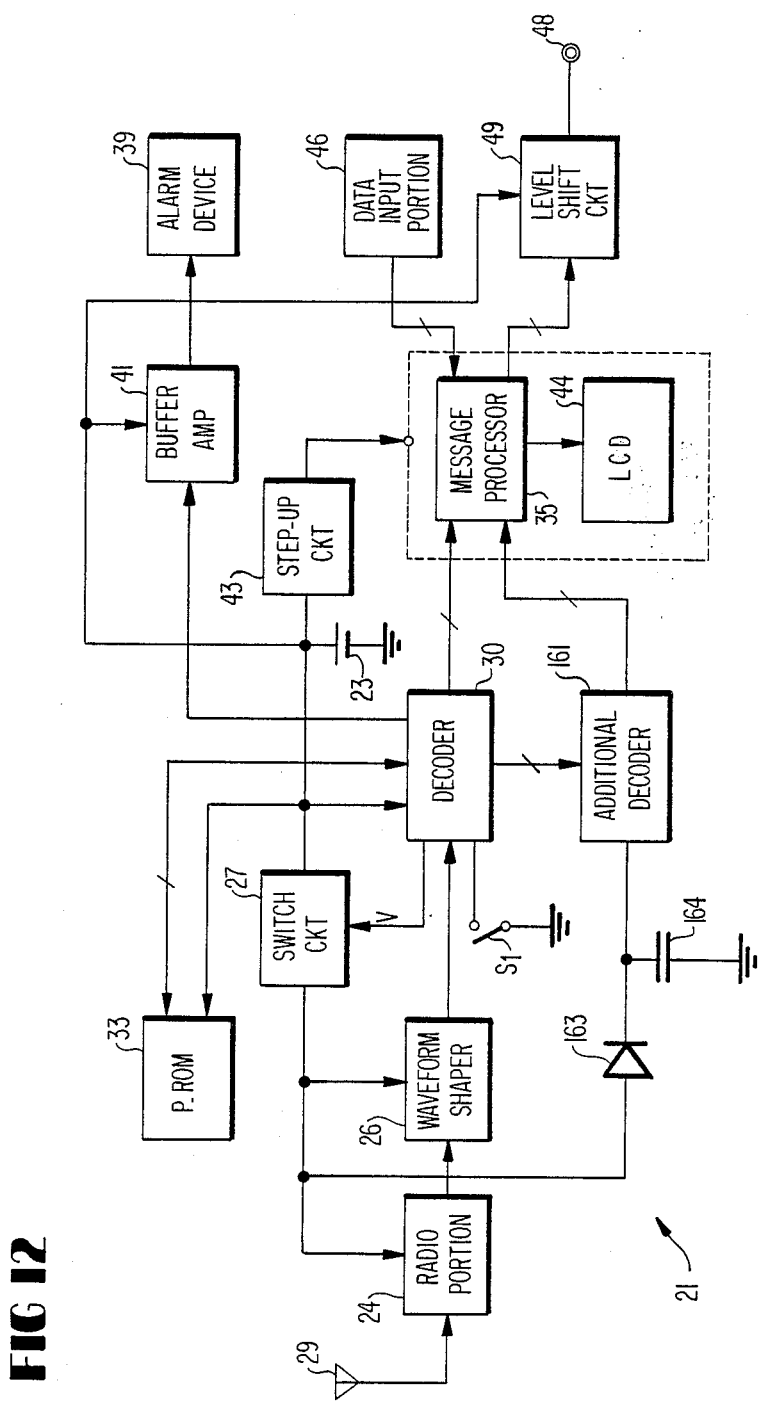
FIG. 12 is a block diagram of the pager receiver according to a second embodiment of this invention.

Referring to FIG. 12, a pager receiver according to a second embodiment of this invention is similar to that illustrated in FIG. 2 except that an additional decoder 161 cooperates with the decoder 30 and the message processor 35 so as to carry out registration and alteration of a common identification number signal representative of a common identification number. The illustrated additional decoder 161 is connected to the switch circuit 27 through a diode 163 and a capacitor 164. Thereafter, the additional decoder 161 is supplied with the source voltage in a manner similar to the radio portion 24 and the waveform shaper 26. Anyway, the pager receiver 21 illustrated in FIG. 11 carries out the operations described in conjunction with the pager receiver illustrated in FIG. 2.

The illustrated decoder 30 supplies the selection signal V to the switch circuit 27 in the manner described in conjunction with the pager receiver according to the first embodiment. As a result, the illustrated pager receiver 21 carries out the battery saving operation before reception of the call signals and is intermittently put into the operating and nonoperating modes after reception of the call signals like the first embodiment. From this fact, it is readily understood that the preamble signal P and the synchronization signal SC are detected by the decoder 30 in the operating mode. The decoder 30 delivers a detection signal $DT_2$ representative of detection of the synchronization signal SC in the above-mentioned manner.

Figure 13:
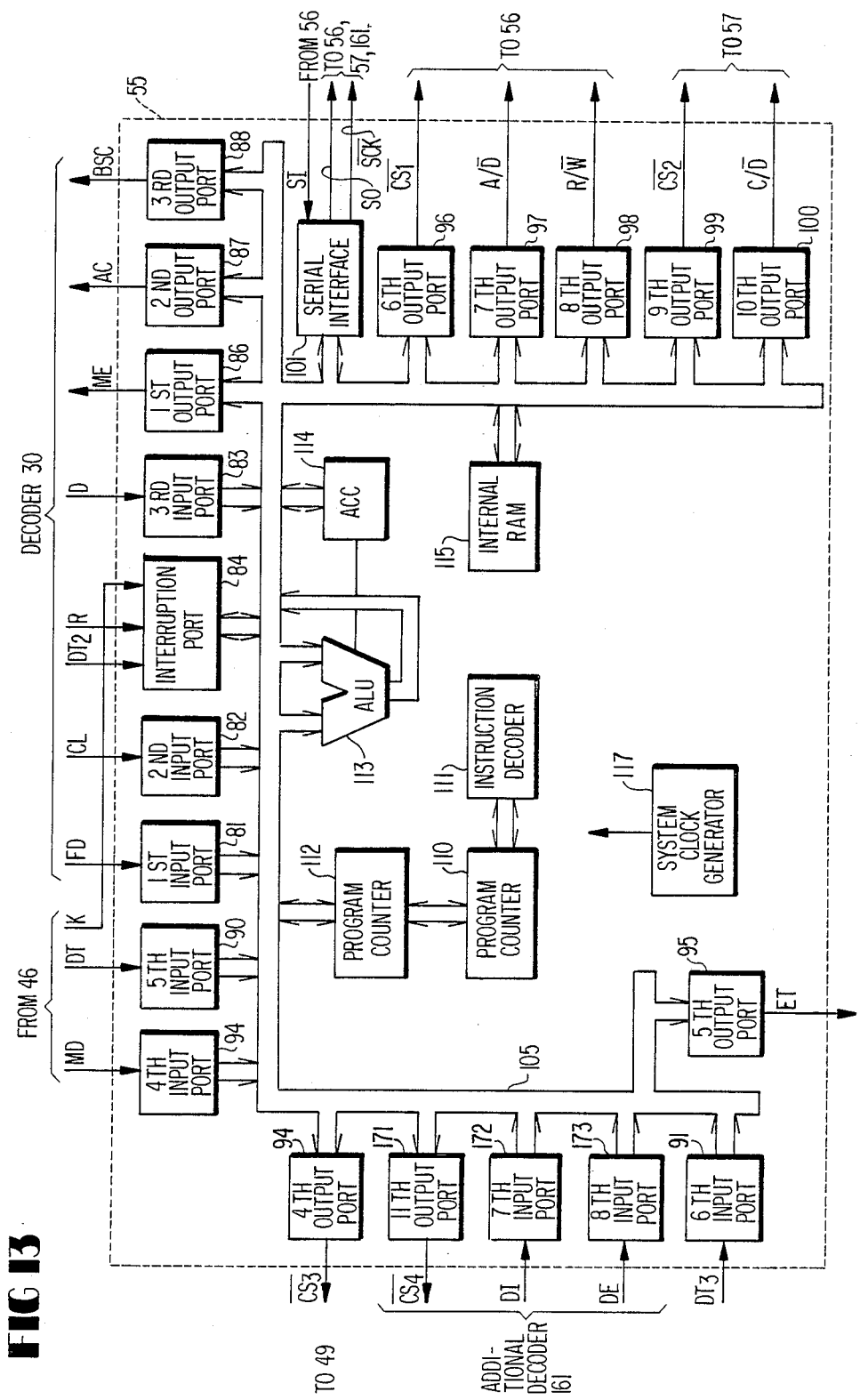
FIG. 13 is a block diagram of a central processing unit operable as a part of a message processor illustrated in FIG. 12.

Referring to FIG. 13 together with FIG. 12, the central processing unit 55 is similiar to that illustrated in FIG. 7 except that the central processing unit 55 (FIG. 13) comprises an eleventh input port 171 and seventh and eighth input ports 172 and 173 connected to the additional decoder 161. The detection signal $DT_2$ is sent to the central processing unit 55 and the additional decoder 161 on detection of the synchronization signal SC to energize the same. When coincidence is detected between the address signal A and a preassigned call number signal, the decoder 30 supplies the central processing unit 55 with the detection signal $DT_3$ indicative of detection of the address signal A. The detection signal $DT_3$ is delivered through the sixth input port 91 to the central processing unit 55.

The following message signals are supplied as the message pulses D to the third input port 83 of the central processing unit 55 and are processed in the manner described with reference to FIG. 7.

Let the second control signal I carry the message control signal (MCS) having a specific pattern of "1000001." As exemplified in Table 1, the specific pattern is indicative of registration of a common identification number. Inasmuch as the message control signal (MCS) is followed by the time signal (TS), as mentioned before the internal clock of the central processing unit 55 is corrected with reference to the time signal (TS) in the manner described before.

The following message signal is decoded into a decoded code of 31 bits by the central processing unit 55. The central processing unit 55 extracts an information signal of 20 bits from the decoded code of 31 bits and thereafter interprets the information signal. On registration of the identification number, a sequence of the information signals is successively received from the decoder 30 and interpreted by the central processing unit 55 as will presently be described.

If the ISO code of seven bits is designated by the first field $Z_1$ of the first control signal I, each information signal is processed at every group of seven bits. Let the information signal sequence have a pattern given by:

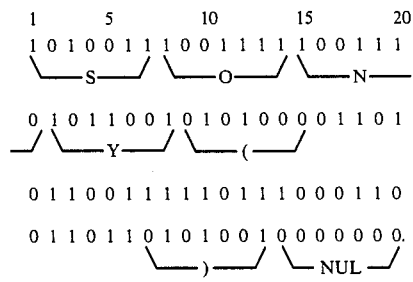

In this event, the name of "SONY" and the corresponding identification number or pattern "01101 . . . 110" in a pair of parentheses are registered in the random access memory 56 (FIGS. 5 and 9). Specifically, the random access memory 56 may have a plurality of common identification areas for common identification numbers. An empty one of the common identification areas is labelled "SONY" while an address number assigned to the empty common identification area is transmitted to the additional decoder 161 together with the common identification pattern. It is assumed that the address number is specified by "0110," namely, "6."

Figure 14:
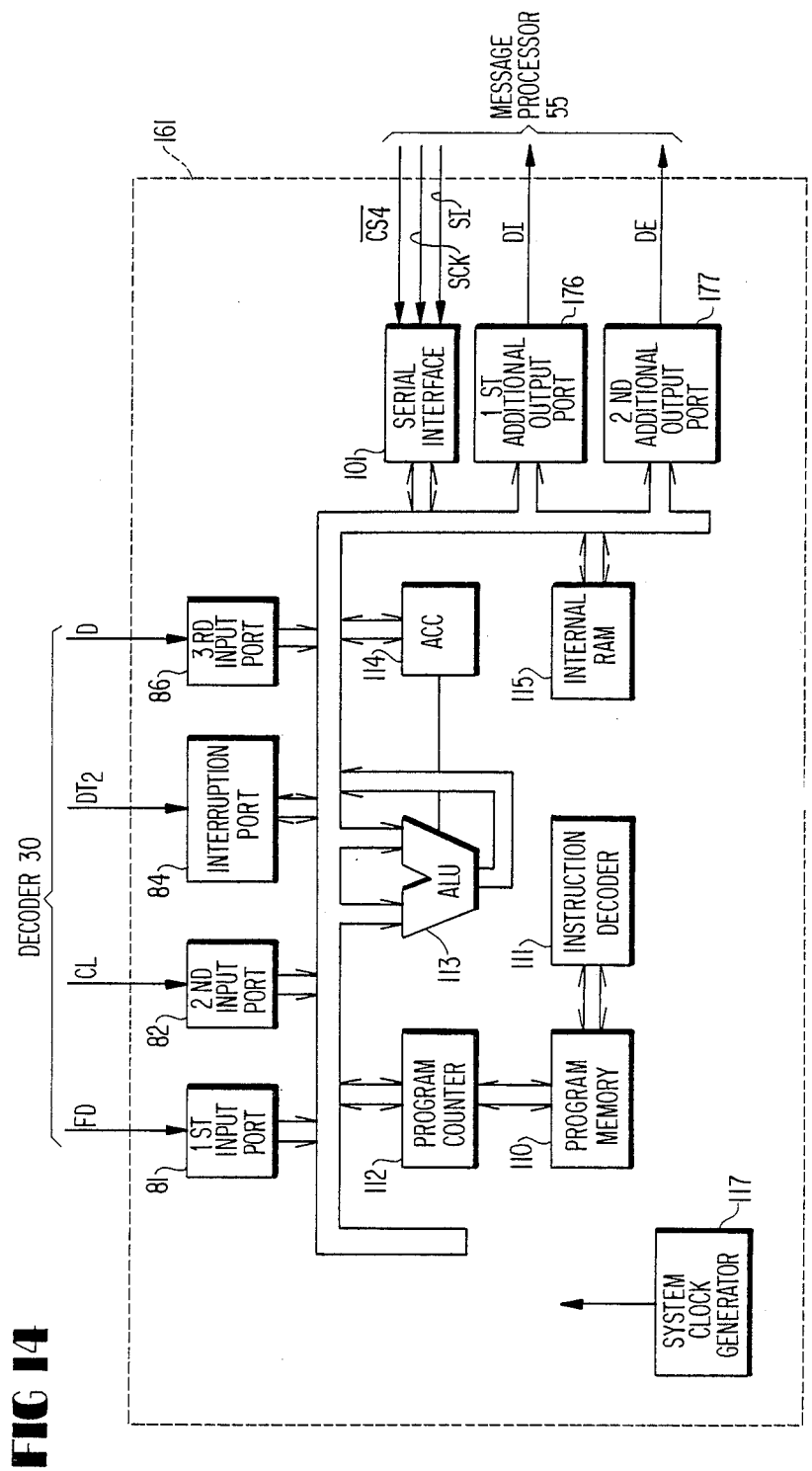
FIG. 14 is a block diagram of an additional decoder illustrated in FIG. 12.

Referring to FIG. 14 together with FIG. 13, the additional decoder 161 may be a single chip microprocessor like the message processor 55 and therefore comprises similar parts and signals designated by like reference numerals and symbols.

On transmission of the address number and the identification pattern, the central processing unit (FIG. 13) puts a chip selection line $\overline{CS_4}$ connected to the eleventh input port 171 into the logic "0" level. The system clock pulse sequence is sent from the serial interface 101 (FIG. 13) to the signal line $\overline{SCK}$. Simultaneously, the address number "0110" and the common identification pattern are sent from the serial interface 101 (FIG. 12) through the serial output line SO in timed relation to the system clock pulse sequence.

In FIG. 14, the chip selection line $\overline{CS_4}$ and the signal line $\overline{SCK}$ of the additional decoder 161 are coupled to the serial interface 101 of the central processing unit 55. Likewise, a serial input line SI of FIG. 14 is connected to the serial output line SO of FIG. 13. Supplied with the logic "0" level through the chip selection line $\overline{CS_4}$, the additional decoder 161 is enabled to receive the address number and the common identification pattern. The common identification number is registered in a sixth address of the internal random access memory 115 with reference to the address number "0110."

On the other hand, let the name of '37 TDK" be changed or altered to "NEC." Such alteration is possible by transmitting the pattern of "1000010" as the message control signal (MCS) of the second control signal I to the pager receiver in question, as readily understood from Table 1. In this event, the central processing unit 55 (FIG. 13) detects information signals having a pattern specified by:

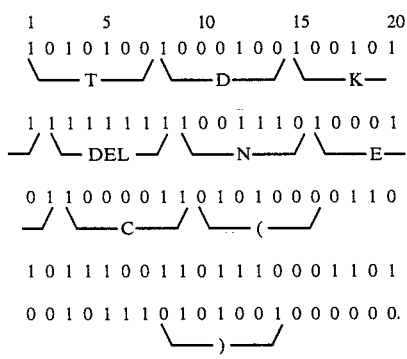

The central processing unit 55 illustrated in FIG. 13 searches for a preassigned area of the random access memory 56 (FIG. 5) assigned to the name of "TDK" and rewrites the preassigned area into "NEC." Subsequently, the chip selection line $\overline{CS_4}$ is given the logic "0" level while an address number of the preassigned area is transmitted together with a common identification pattern "0110 . . . 0111" corresponding to the name of "NEC" in the above-mentioned manner. As a result, the common identification pattern is stored in an area of the internal random access memory 115 (FIG. 14) corresponding to the address number.

Thus, the internal random access memory 115 of the additional decoder 161 is loaded with the common identification pattern or patterns. Under the circumstances, the additional decoder 161 is supplied with the message pulses D through the third input port 86 in synchronism with the clock pulses CL given through the second input port 82, after the decoder 30 detects reception of the synchronization signal SC. The message pulses D are decoded into an information signal of 20 bits and sent through the data bus 105 to the arithmetic and logic unit 113 to be compared bit by bit with each common identification number registered in the internal random access memory 115.

When coincidence is detected between the information signal and one of the common identification numbers, a common data detection signal DI is delivered from a first additional output port 176 to the central processing unit 55 (FIG. 13) of the message processor 35. An address area signal DE is also delivered from a second additional output port 177 to specify the common identification area for the detected common identification number.

In FIG. 13, the central processing unit 55 recognizes reception of a common identification number in response to the common data detection signal DI given through the seventh input port 172. Subsequently, the address area signal DE is sent to the eighth input port 173.

In order to memorize the message pulses D following the common identification number in the random access memory 56 of the message processor 35, the address area signal DE is transferred from the serial interface 101 through the serial output line SO to the random access memory 56 with the signal line $\overline{CS_1}$ kept at the logic "0" level. In this case, the system clock pulse sequence and the logic "1" level are sent through the signal lines $\overline{SCK}$ and A/D, respectively. Thus, an address indication for the random access memory 56 is completed by the central processing unit 55.

After completion of the address indication, the message pulses D are decoded into an information signal and stored in an address area of the random access memory 56 which is indicated by the address area signal DE.

Figure 15:
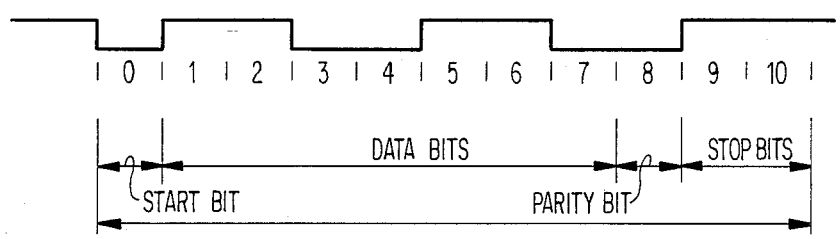
FIG. 15 is a time chart of an external signal produced from the pager receiver.

Referring to FIG. 15 afresh and FIGS. 12 and 13, it is possible to supply the information signal stored in the random access memory 56 in the above-mentioned manner to an external device, such as a printer. In this case, the central processing unit 55 supplies the logic "0" level to a chip selection line $CS_3$ through the fourth output port 94. The information signal is read out of the random access memory 56 to the serial interface 101 and processed into an external signal ET. Such an external signal may have a format exemplified in FIG. 15. The external signal ET is sent through the fifth output port 95 (FIG. 12) through the level shift circuit 49 to the output terminal 48. The external signal ET may be processed in a desired manner by the external device.

Production of the external signal EX is possible in the pager receiver according to the first embodiment.

While this invention has thus far been described in conjunction with a few embodiments thereof, it will readily be possible for those skilled in the art to put this invention into practice in various other manners. For example, the random access memory 56 may be divided into two parts for storing the message related to the common identification number and any other message.

What is claimed is:

1. In a pager receiver capable of responding to call signals, each comprising a first part, a second part, and an intermediate part between said first and second parts, said first part comprising a call number signal specific to said pager receiver while said second part comprises a message signal representative of a message, said pager receiver comprising a power source for supplying a voltage, controllable switching means connected to said power source and responsive to a switching signal for selectively switching the voltage from said power source between an on-state and an off-state, reception means adapted to be put into an operating mode and a nonoperating mode under control of said switching means for receiving said call signals in said operating mode and producing reception call signals representative of the call signals received during said operating mode, processing means responsive to said reception call signals for processing said first, second, and intermediate parts of each of the call signals received during said operating mode to produce a selection signal indicative of either of said on-state or said off-state, and signal supply means for supplying said selection signal as said switching signal to said switching means to selectively put said reception means into said operating and said nonoperating modes, said reception means being controlled by said controllable switching means during reception of no call signals so that said reception means is periodically put into said operating mode which lasts a first interval of time, the improvement wherein:

said intermediate part comprises a time interval signal representative of a length of the message included in the second part following said intermediate part; said processing means comprising:

producing means responsive to said reception call signals for producing said selection signal with reference to said time interval signal to switch said switching means in dependency upon said message length so that said first interval is modified into a second interval of time longer than said first interval when said pager receiver is initialized.

2. A pager receiver as claimed in claim 1, said receiver further comprising an alarm unit, wherein said alarm unit is driven on condition that said intermediate signal is not detected during said first interval.

3. A pager receiver as claimed in claim 1, wherein said producing means produces said selection signal such that said time interval signal can be received even when said reception call signals do not include said call number signal specific to said pager receiver.

4. A pager receiver as claimed in claim 3, wherein said producing means comprises:

detecting means responsive to said reception call signals for detecting said call number signal specific to said pager receiver together with said time interval signal to produce a detection signal representative of a result of detection of said call number signal; and signal producing means coupled to said detecting means for producing said selection signal with reference to both of said detection signal and said time interval signal.

5. A pager receiver as claimed in claim 4, wherein said signal producing means comprises:

measuring means responsive to said time interval signal for measuring said length of the message carried by said second part following said intermediate part; and means coupled to said measuring means for producing said selection signal.

6. A pager receiver as claimed in claim 1, wherein said intermediate part comprises an additional signal which follows said time interval signal and which defines a message processing operation for processing the message signal succeeding said additional signal.

7. A pager receiver as claimed in claim 6, wherein said intermediate part further comprises a time signal which carries time information representative of transmission time of the message signal and which is placed between said additional signal and the message signal.

8. A pager receiver as claimed in claim 6, wherein said additional signal indicates, as said message processing operation, either of registration and alteration of a predetermined identification number carried by the message signal following said additional signal.

9. A pager receiver as claimed in claim 8, wherein said processing means further comprises:

extracting means responsive to said additional signal and said message signal for extracting said predetermined identification number from said message signal.

10. A pager receiver as claimed in claim 9, wherein said processing means comprises:

storage means coupled to said extracting means for storing said predetermined identification number when said additional signal is indicative of said registration.

11. A pager receiver as claimed in claim 10, wherein said processing means comprises:

means coupled to said storage means for altering said identification number to a different identification number when said additional signal is indicative of said alteration of said predetermined identification number and said different identification number is followed by said additional signal.

12. A pager receiver as claimed in claim 6, wherein said additional signal indicates, as said message processing operation, a message arrangement of the message carried by the message signal following said additional signal.

13. A paging method for use in paging a pager receiver by call signals, each call signal comprising a first part and a second part which comprise a call number signal specific to said pager receiver and a message signal representative of a message, respectively, said pager receiver being periodically put into operating and nonoperating modes on nonreception of said call signals, said method comprising the steps of:

transmitting to said pager receiver an intermediate part which is between said first and second parts and which carries a time interval signal representative of a length of the message included in the second part following said intermediate part; and controlling an internal state of said pager receiver in response to said time interval signal.

14. A paging method as claimed in claim 13, wherein said time interval signal is for modifying a duration for said operating mode in response to said intermediate signal.

15. A paging method as claimed in claim 13, wherein said intermediate signal is for controlling a transmission time instant of the message.

* * * * *